United States Patent
Wang et al.

(10) Patent No.: US 10,819,549 B2
(45) Date of Patent: Oct. 27, 2020

(54) RECEIVER OF FILTER BANK MULTICARRIER COMMUNICATION SYSTEM BASED ON DISCRETE HARTLEY TRANSFORM

(71) Applicant: National Tsing Hua University, Hsinchu (TW)

(72) Inventors: Chin-Liang Wang, Hsinchu (TW); Hong-Shiuann Pan, Tainan (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 16/901,157

(22) Filed: Jun. 15, 2020

(65) Prior Publication Data

US 2020/0313950 A1   Oct. 1, 2020

Related U.S. Application Data

(62) Division of application No. 16/732,921, filed on Jan. 2, 2020, now Pat. No. 10,735,238.

(30) Foreign Application Priority Data

Jan. 18, 2019 (TW) .............................. 108101960 A

(51) Int. Cl.
*H04L 27/26* (2006.01)
(52) U.S. Cl.
CPC ...... *H04L 27/2649* (2013.01); *H04L 27/2602* (2013.01)

(58) Field of Classification Search
CPC .............. H04L 27/264; H04L 27/2649; H04L 27/2697; H04L 27/04
See application file for complete search history.

(56) References Cited

U.S. PATENT DOCUMENTS

| | | |
|---|---|---|
| 9,054,838 B1 | 6/2015 | Harris |
| 2003/0236806 A1 | 12/2003 | Hou |
| 2007/0201574 A1 | 8/2007 | Wu et al. |
| 2011/0249709 A1 | 10/2011 | Shiue et al. |
| 2015/0092885 A1 | 4/2015 | Li et al. |
| 2016/0204822 A1* | 7/2016 | Yu .................... H04B 1/7101 375/219 |
| 2016/0211998 A1 | 7/2016 | Sun et al. |

FOREIGN PATENT DOCUMENTS

| | | |
|---|---|---|
| CN | 107181712 A | 9/2017 |
| TW | 201018125 A1 | 5/2010 |

* cited by examiner

*Primary Examiner* — Ted M Wang
(74) *Attorney, Agent, or Firm* — Birch, Stewart, Kolasch & Birch, LLP

(57) ABSTRACT

A filter bank multicarrier communication system is proposed. The system adopts the real-valued discrete Hartley transform for both multicarrier modulation and demodulation, rather than the complex-valued inverse discrete Fourier transform for multicarrier modulation and the discrete Fourier transform for multicarrier demodulation in conventional filter bank multicarrier schemes, so as to reduce implementation complexity and to enhance system performance.

4 Claims, 10 Drawing Sheets

RECEIVER OF FILTER BANK MULTICARRIER COMMUNICATION SYSTEM BASED ON DISCRETE HARTLEY TRANSFORM

CROSS-REFERENCE TO RELATED APPLICATION

This application is a divisional patent application of U.S. patent application Ser. No. 16/732,921, filed Jan. 2, 2020, which claims priority to Taiwanese Application No. 108101960, filed on Jan. 18, 2019.

FIELD

The disclosure relates to a filter bank multicarrier communication system, and more particularly to a filter bank multicarrier communication system based on the discrete Hartley transform (DHT).

BACKGROUND

To fulfill the continuous growth of market demands, future wireless communications are required to have a very high data rate, a very large system capacity, a very low latency, etc. Among a number of technologies considered for these purposes, filter bank multicarrier (FBMC) transmission is a promising one, because this kind of scheme can lessen intersymbol interference (ISI) and intercarrier interference (ICI) without using guard intervals or cyclic prefixes and can achieve a higher spectral efficiency than orthogonal frequency division multiplexing (OFDM) transmission adopted by 4G wireless communication systems.

There are several FBMC approaches in the literature, including cosine modulated multitone, discrete wavelet multitone, filtered multitone, and OFDM using offset quadrature amplitude modulation (OFDM/OQAM), which is also referred to as FBMC/OQAM or staggered modulated multitone. Different from OFDM using quadrature amplitude modulation (OFDM/QAM) with each complex QAM data symbol modulated on a subcarrier during an OFDM frame duration, FBMC/OQAM transmits the real part and the imaginary part (including the imaginary "j" symbol) of each complex QAM data symbol on a subcarrier successively according to a staggering arrangement of timing offset that equals half an FBMC frame duration. Specifically, the real-part and imaginary-part data are placed on each subcarrier for FBMC/OQAM in a way that orthogonality among subcarriers and FBMC symbols holds in the real field, rather than in the complex field as with OFDM/QAM.

FBMC/OQAM adopts a time-frequency localized prototype (pulse shaping) filter with reduced sidelobes in both the time and frequency domains to lessen the ISI/ICI problems. Several types of prototype filters have been proposed for this purpose, including the root raised cosine function, half-cosine function, extended Gaussian function, isotropic orthogonal transform algorithm, and physical layer for dynamic access and cognitive radio (PHYDYAS) filter developed in an EU-funded research project.

Although an FBMC/OQAM system achieves excellent performance under single-input single-output (SISO) scenarios, conventional multiple-input multiple-out (MIMO) techniques such as Alamouti space-time block coding (STBC) and maximum likelihood detection cannot be applied directly, and some modifications along with complicated receivers are required. This is an undesired feature that limits applications of FBMC/OQAM.

For an FBMC/OQAM system with M subcarriers, a synthesis filter bank of a transmitter needs to perform two complex M-point inverse discrete Fourier transforms (IDFTs) for modulation and specific synthesis filtering operations in order to transmit a sequence of complex M-point QAM data symbols. On the other hand, an analysis filter bank of a receiver needs to perform two complex M-point discrete Fourier transforms (DFTs) for demodulation, specific analysis filtering operations, and appropriate data detection operations in order to receive a sequence of complex M-point QAM data symbols. Since this scheme uses the complex-valued IDFT and DFT, it is referred to as DFT-FBMC/OQAM.

To facilitate extension to MIMO scenarios, another kind of FBMC using IDFT/DFT and QAM, referred to as DFT-FBMC/QAM, was proposed recently, where a complete complex QAM data symbol is transmitted on a subcarrier during an FBMC frame duration. This kind of scheme adopts a set of two or more specific prototype filters, instead of a single prototype filter as used in DFT-FBMC/OQAM, to minimize self-interference. For example, with two orthogonal prototype filters, we can use one of them for even-numbered subcarriers and the other for odd-numbered subcarriers to effectively relieve the ISI/ICI problems. It was shown that DFT-FBMC/QAM using two prototype filters achieves slightly worse bit-error-rate (BER) performance than DFT-FBMC/OQAM, but is more easily combined with existing MIMO techniques.

For an FBMC/QAM system with M subcarriers and two prototype filters, a synthesis filter bank of a transmitter needs to perform two complex M/2-point IDFTs for modulation and specific synthesis filtering operations in order to transmit a sequence of complex M-point QAM data symbols. In contrast, an analysis filter bank of a receiver needs to perform two complex M/2-point DFTs for demodulation, specific analysis filtering operations, and appropriate data detection operations in order to receive a sequence of complex M-point QAM data symbols. Although this DFT-FBMC/QAM scheme involves complex-valued IDFT/DFT computations, its implementation complexity is lower than that of the DFT-FBMC/OQAM system.

SUMMARY

The disclosure provides a filter bank multicarrier (FBMC) communication system using QAM, the inverse discrete Hartley transform (IDHT), and the discrete Hartley transform (DHT) that has similar advantages in terms of MIMO extension and implementation complexity to the DFT-FBMC/QAM scheme but is able to achieve better performance. The DHT-based FBMC communication system is referred to as DHT-FBMC/QAM, which includes a transmitter and a receiver.

According to the disclosure, the transmitter includes a serial-to-parallel conversion unit, a first pre-processing unit, a second pre-processing unit, a first data separator, a second data separator, a first synthesis filter bank, and a second synthesis filter bank. The serial-to-parallel conversion unit is configured to perform serial-to-parallel conversion on M serial complex data symbols, each including a real part and an imaginary part, for outputting M real parts and M imaginary parts of the M complex data symbols in parallel, where M is a positive even integer. The first pre-processing unit is coupled to the serial-to-parallel conversion unit for receiving the M real parts, and is configured to generate M pre-processed real-part components based on a pre-processing model. The second pre-processing unit is coupled to the serial-to-parallel conversion unit for receiving the M imaginary parts, and is configured to generate M pre-processed imaginary-part components based on the pre-processing model. The first data separator is coupled to the first pre-processing unit for receiving the M pre-processed real-part components, and is configured to separate the received components into M/2 even-numbered pre-processed real-part components and M/2 odd-numbered pre-processed real-part components. The second data separator is coupled to the second pre-processing unit for receiving the M pre-processed imaginary-part components, and is configured to separate the received components into M/2 even-numbered pre-processed imaginary-part components and M/2 odd-numbered pre-processed imaginary-part components. The first synthesis filter bank is coupled to the first data separator for receiving the M/2 even-numbered pre-processed real-part components and the M/2 odd-numbered pre-processed real-part components in parallel, and is configured to generate a first-channel transmitted (abbreviated as Tx) baseband signal of M points by performing at least up-sampling, filtering, IDHT, data combination, and parallel-to-serial conversion on these pre-processed real-part components. The second synthesis filter bank is coupled to the second data separator for receiving the M/2 even-numbered pre-processed imaginary-part components and the M/2 odd-numbered pre-processed imaginary-part components, and is configured to generate a second-channel Tx baseband signal of M points by performing at least up-sampling, filtering, IDHT, data combination, and parallel-to-serial conversion on these pre-processed imaginary-part components.

According to the disclosure, the receiver includes a first analysis filter bank, a second analysis filter bank, a data detection unit, a first data combiner, a second data combiner, a first post-processing unit, a second post-processing unit, and a parallel-to-serial conversion unit. The first analysis filter bank is disposed to process a serial first-channel received (abbreviated as Rx) baseband signal of M points, and is configured to generate a first part and a second part of a filtered first-channel Rx baseband signal by performing at least serial-to-parallel conversion, down-sampling, filtering, data combination, and DHT on the received signals, wherein each of the first part and the second part has M/2 components. The second analysis filter bank is disposed to process a serial second-channel Rx baseband signals of M points, and is configured to generate a first part and a second part of a filtered second-channel Rx baseband signal by performing at least serial-to-parallel conversion, down-sampling, filtering, data combination, and DHT on the second-channel Rx baseband signals, wherein each of the first part and the second part has M/2 components. The data detection unit is coupled to the first analysis filter bank and the second analysis filter bank. This unit is configured to generate M/2 first first-channel detection results corresponding to the first part of the filtered first-channel Rx baseband signal and M/2 first second-channel detection results corresponding to the first part of the filtered second-channel Rx baseband signal by performing joint detection on the first parts of the filtered first-channel and second-channel Rx baseband signals as well as to generate M/2 second first-channel detection results corresponding to the second part of the filtered first-channel Rx baseband signal and M/2 second second-channel detection results corresponding to the second part of the filtered second-channel Rx baseband signal by performing joint detection on the second parts of the filtered first-channel and second-channel Rx baseband signals. The first data combiner is coupled to the data detection unit, and is configured to generate M first-channel detection outcomes by combining the M/2 first first-channel detection results and the M/2 second first-channel detection results. The second data combiner is coupled to the data detection unit, and is configured to generate M second-channel detection outcomes by combining the M/2 first second-channel detection results and the M/2 second second-channel detection results. The first post-processing unit is coupled to the first data combiner, and is configured to generate M first post-processed components based on the M first-channel detection outcomes and a post-processing model. The second post-processing unit is coupled to the second data combiner, and is configured to generate M second post-processed components based on the M second-channel detection outcomes and the post-processing model. The parallel-to-serial unit is coupled to the first post-processing unit and the second post-processing unit, and is configured to output complex output data symbols in series by performing parallel-to-serial conversion on the M first post-processed components and the M second post-processed components.

BRIEF DESCRIPTION OF THE DRAWINGS

Other features and advantages of the disclosure will become apparent in the following detailed descriptions of the embodiment (s) with reference to the accompanying drawings including.

DETAILED DESCRIPTION

Figure 1:
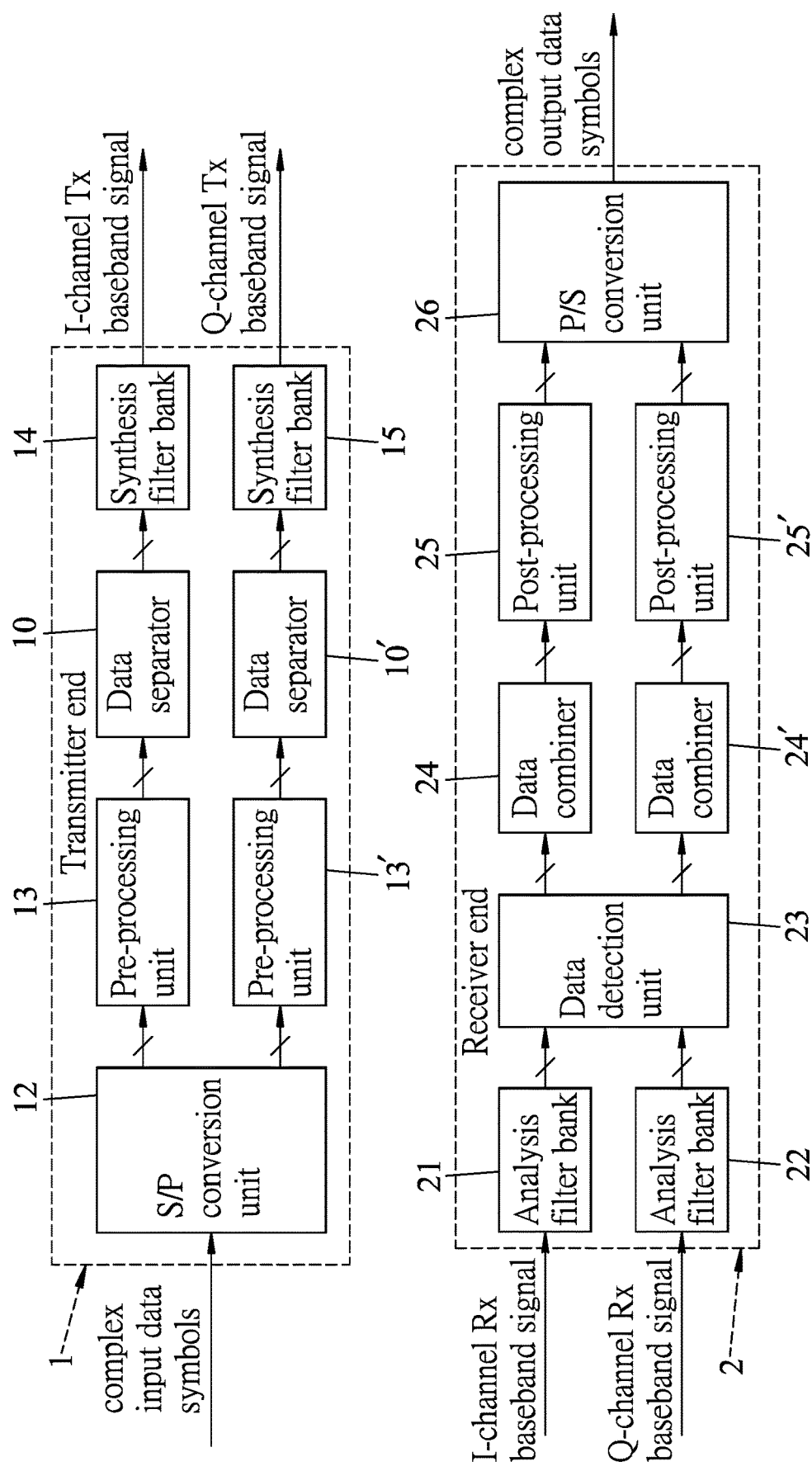
FIG. 1 is a block diagram illustrating an embodiment of the filter bank multicarrier (FBMC) communication system based on the discrete Hartley transform (DHT) according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, the embodiment of the filter bank multicarrier (FBMC) communication system based on the discrete Hartley transform (DHT) according to this disclosure is shown that includes a transmitter end 1 and a receiver end 2.

In FIG. 1, the transmitter end 1 generates an I-channel Tx (meaning transmitted) baseband signal (first-channel Tx baseband signal) and a Q-channel Tx baseband signal (second-channel Tx baseband signal) based on M complex input data symbols, each including a real part and an imaginary part, and transmits the I-channel Tx baseband signal and the Q-channel Tx baseband signal to the receiver end 2 via an I-channel (first channel) and a Q-channel (second channel), respectively, where M is a positive even integer. The transmitter end 1 includes a serial-to-parallel (S/P) conversion unit 12, two pre-processing units 13, 13', two data separators 10, 10', and two synthesis filter banks 14, 15.

The serial-to-parallel conversion unit 12 performs serial-to-parallel conversion on the M complex input data symbols, which are inputted thereto in series, and outputs the M real parts and the M imaginary parts of the complex input data symbols in parallel. In this embodiment, the complex input data symbols are represented by $d_{m,n}=d_{m,n}^I+jd_{m,n}^Q$ $m \in \{0,1,K,M-1\}$, where $d_{m,n}$ represents an $m^{th}$ one of the M complex input data symbols that are transmitted on M subcarriers at a time point n, $d_{m,n}^I$ represents the real part of $d_{m,n}$, and $d_{m,n}^Q$ represents the imaginary part of $d_{m,n}$.

The pre-processing unit 13 is a pre-processor coupled to the serial-to-parallel conversion unit 12 for receiving the M real parts of the complex input data symbols, and generates M pre-processed real-part components based on a pre-processing model and the received M real parts.

The pre-processing unit 13' is a pre-processor coupled to the serial-to-parallel conversion unit 12 for receiving the M imaginary parts of the complex input data symbols, and generates M pre-processed imaginary-part components based on the pre-processing model and the received M imaginary parts.

In this embodiment, the pre-processing model is exemplified by:

$$X_{m,n} = (d_{m,n} \cos \theta_m + (-1)^{L-1} d_{M-m,n} \sin \theta_m), m=0,1,K,M-1,$$

where $X_{m,n}$ represents a pre-processing result that is based on $d_{m,n}$ and $d_{M-m,n}$ and that is on an $m^{th}$ one of the subcarriers at a time point n; $\theta_m = (2\pi m/M)(L-1)/2$ could be regarded as a rotation angle on the $m^{th}$ one of the subcarriers; and L represents a prototype filter length used for each of the synthesis filter banks 14, 15. Accordingly, one of the M pre-processed real-part components that is outputted by the pre-processing unit 13 and that is transmitted on the I-channel of the $m^{th}$ one of the subcarriers at the time point n can be represented by $X_{m,n}^I$, and one of the M pre-processed imaginary-part components that is outputted by the pre-processing unit 13' and that is transmitted on the Q-channel of the $m^{th}$ one of the subcarriers at the time point n can be represented by $X_{m,n}^Q$, wherein $$X_{m,n}^I = (d_{m,n}^I \cos \theta_m + (-1)^{L-1} d_{M-m,n}^I \sin \theta_m), m=0,1,K,M-1$$

and $$X_{m,n}^Q = (d_{m,n}^Q \cos \theta_m + (-1)^{L-1} d_{M-m,n}^Q \sin \theta_m), m=0,1,K,M-1.$$

The data separator 10 is coupled to the pre-processing unit 13 for receiving the M pre-processed real-part components, and separates them into M/2 even-numbered pre-processed real-part components and M/2 odd-numbered pre-processed real-part components.

The data separator 10' is coupled to the pre-processing unit 13' for receiving the M pre-processed imaginary-part components, and separates them into M/2 even-numbered pre-processed imaginary-part components and M/2 odd-numbered pre-processed imaginary-part components.

The synthesis filter bank 14 is coupled to the data separator 10 for receiving the M/2 even-numbered pre-processed real-part components and the M/2 odd-numbered pre-processed real-part components, and generates the I-channel Tx baseband signal of M points by performing at least up-sampling, filtering, inverse discrete Hartley transform (IDHT), data combination, and parallel-to-serial conversion on all the received pre-processed real-part components. In practice, the synthesis filter 14 may be realized as a dedicated processor, a general-purpose processor in cooperation with a firmware that implements the functions described in this disclosure, or a general-purpose processor that executes a software program designed to implement the functions described in this disclosure, but this disclosure is not limited in this respect.

The synthesis filter bank 15 is coupled to the data separator 10' for receiving the M/2 even-numbered pre-processed imaginary-part components and the M/2 odd-numbered pre-processed imaginary-part components, and generates a Q-channel Tx baseband signal of M point s by performing at least up-sampling, filtering, IDHT, data combination, and parallel-to-serial conversion on all the received pre-processed imaginary-part components.

Figure 2:
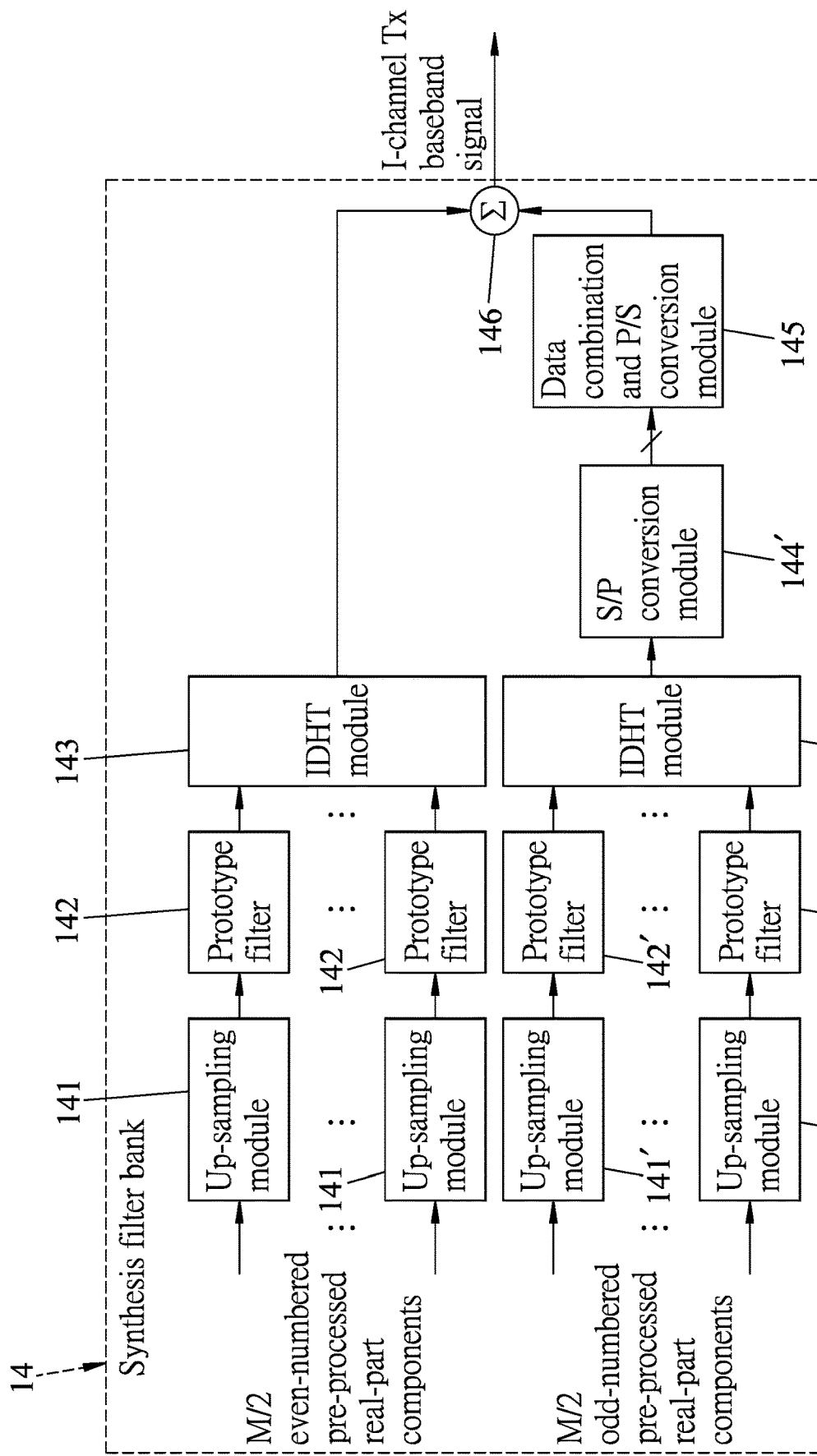
FIGS. 2 and 3 are block diagrams illustrating first implementations of synthesis filter banks of the embodiment.

In this embodiment, two exemplary implementations for each of the synthesis filter banks 14, 15 are provided. FIGS. 2 and 4 respectively illustrate first and second exemplary implementations of the synthesis filter bank 14, and FIGS. 3 and 5 respectively illustrate first and second exemplary implementations of the synthesis filter bank 15.

Referring to FIG. 2, the first implementation of the synthesis filter bank 14 includes M/2 up-sampling modules 141, M/2 up-sampling modules 141', M/2 prototype filters 142, M/2 prototype filters 142', two IDHT modules 143, 143', a serial-to-parallel conversion module 144', a data combination and parallel-to-serial (P/S) conversion module 145, and an adder 146.

The M/2 up-sampling modules 141 are coupled to the data separator 10 (see FIG. 1) for respectively receiving the M/2 even-numbered pre-processed real-part components. Each of the up-sampling modules 141 performs up-sampling on the respective one of the M/2 even-numbered pre-processed real-part components by a factor of M.

The M/2 up-sampling modules 141' are coupled to the data separator 10 (see FIG. 1) for respectively receiving the M/2 odd-numbered pre-processed real-part components. Each of the up-sampling modules 141' performs up-sampling on the respective one of the M/2 odd-numbered pre-processed real-part components by a factor of M.

The M/2 prototype filters 142 are respectively coupled to the M/2 up-sampling modules 141 for respectively receiving the M/2 even-numbered pre-processed real-part components that have been up-sampled by the M/2 up-sampling modules 141. Each of the prototype filters 142 performs filtering on the respective one of the M/2 even-numbered pre-processed real-part components that has been up-sampled.

The M/2 prototype filters 142' are respectively coupled to the M/2 up-sampling modules 141' for respectively receiving the M/2 odd-numbered pre-processed real-part components that have been up-sampled by the M/2 up-sampling modules 141'. Each of the prototype filters 142' performs filtering on the respective one of the M/2 odd-numbered pre-processed real-part components that has been up-sampled.

In this embodiment, the prototype filters 142 are identical (denoted by $p_0[k]$ and the prototype filters 142' are identical (denoted by $p_1[k]$), where $p_0[k]$ is orthogonal or nearly orthogonal to $p_1[k]$. The prototype filter $p_0[k]$ may be realized by the root raised cosine function, half-cosine function, extended Gaussian function, isotropic orthogonal transform algorithm, or physical layer for dynamic access and cognitive radio (PHYDYAS) filter, while the prototype filter $p_1[k]$ may be designed based on $p_0[k]$ to minimize intersymbol interference (ISI) and intercarrier interference (ICI), and vice versa. The length of each of the prototype filters $p_0[k]$ and $p_1[k]$ is represented by L, and its value may be L=KM, L=KM−1, or L=KM+1, where K is a positive integer called an overlapping factor. However, this disclosure is not limited in each of the above respects.

The IDHT module 143 is coupled to the M/2 prototype filters 142 for receiving, in parallel, the M/2 even-numbered pre-processed real-part components that have been up-sampled by the M/2 up-sampling modules 141 and filtered by the M/2 prototype filters 142. For two sets of the M/2 even-numbered pre-processed real-part components that have been up-sampled and filtered and that are consecutively received by the IDHT module 143 (i.e., each set has M/2 components), the IDHT module 143 consecutively generates two serial first-IDHT results of M/2 points (for each serial first-IDHT result of M/2 points, the M/2 points are outputted in series), which serve as a first part of the I-channel Tx baseband signal, by performing M/2-point IDHT operations (also referred to as IDHTs throughout this disclosure) on the two sets of the M/2 even-numbered pre-processed real-part components that have been up-sampled and filtered and that are received by the IDHT module 143 consecutively.

In this embodiment, the IDHT module 143 obtains the first-IDHT results according to:

$$s_0^I[k] = y_0^I[k] = \sum_{\alpha=0}^{M/2-1} Y_{0,\alpha}^I[k] cas\left(\frac{2\pi\alpha k}{M/2}\right), k = 0, 1, 2, K, M-1,$$

where $y_0^I[k]$ represents an output of the IDHT module 143; $s_0^I[k]$ represents the first part of the I-channel Tx baseband signal (namely, the output result obtained from the M/2 even-numbered pre-processed real-part components processed by the modules 141, 142, 143 of the synthesis filter bank 14);

$$Y_{0,\alpha}^I[k] = \sum_{n=-\infty}^{\infty} X_{2\alpha,n}^I p_0[k-nM]$$

represents a result obtained from $X_{2\alpha,n}^I$ being up-sampled by one of the up-sampling modules 141 followed by being processed by one of the prototype filters 142 ($p_0[k]$), wherein $X_{2\alpha,n}^I$ is an $\alpha^{th}$ one of the M/2 even-numbered pre-processed real-part components, $\alpha\in\{0,1,2,K,M/2-1\}$; and $cas(\phi)=cos(\phi)+sin(\phi)$.

The IDHT module 143' is coupled to the M/2 prototype filters 142' for receiving, in parallel, the M/2 odd-numbered pre-processed real-part components that have been up-sampled by the M/2 up-sampling modules 141' and filtered by the prototype filters 142'. For two sets of the M/2 odd-numbered pre-processed real-part components that have been up-sampled and filtered and that are consecutively received by the IDHT module 143', the IDHT module 143' consecutively generates two serial second-IDHT results of M/2 points (for each serial second-IDHT result of M/2 points, the M/2 points are outputted in series) by performing M/2-point IDHTs on the two sets of the M/2 odd-numbered pre-processed real-part components that have been up-sampled and filtered and that are received by the IDHT module 143' consecutively.

In this embodiment, the IDHT module 143' obtains the second-IDHT results according to:

$$y_1^I[k] = \sum_{\alpha=0}^{M/2-1} Y_{1,\alpha}^I[k] cas\left(\frac{2\pi\alpha k}{M/2}\right), k = 0, 1, 2, K, M-1,$$

where $y_1^I[k]$ represents an output of the IDHT module 143'; and $$Y_{1,\alpha}^I[k] = \sum_{n=-\infty}^{\infty} X_{2\alpha+1,n}^I p_1[k-nM]$$

stands for a result obtained from $X_{2\alpha+1,n}^I$ being up-sampled by one of the up-sampling modules 141' followed by being processed by one of the prototype filters 142' ($p_1[k]$), wherein is an $\alpha^{th}$ one of the M/2 odd-numbered pre-processed real-part components, $\alpha\in\{0,1,2,K,M/2-1\}$. It is noted that each of the M/2 prototype filters 142 (R[k]) corresponding to even-numbered subcarriers is orthogonal or nearly orthogonal to each of the M/2 prototype filters 142' ($p_1[k]$) corresponding to odd-numbered subcarriers, so as to lessen ICI and ISI.

The serial-to-parallel conversion module 144' is coupled to the IDHT module 143' for receiving the two serial second-IDHT results of M/2 points, and consecutively outputs two parallel second-IDHT results of M/2 points (the M/2 points of each parallel second-IDHT result are outputted in parallel) by performing serial-to-parallel conversion on each of the two serial second-IDHT results of M/2 points.

The data combination and parallel-to-serial conversion module 145 is coupled to the serial-to-parallel conversion module 144' for receiving the two parallel second-IDHT results of M/2 points, and generates a second part of the I-channel Tx baseband signal by, for each of the two parallel second-IDHT results of M/2 points, performing data combination on the parallel second-IDHT result of M/2 points to obtain a data combination result in a manner as described below, and performing parallel-to-serial conversion on the data combination result for the parallel second-IDHT result of M/2 points.

In this embodiment, the second part of the I-channel Tx baseband signal (namely, the output results obtained from the M/2 odd-numbered pre-processed real-part components processed by components 141', 142', 143', 144', 145 of the synthesis filter bank 14), which is represented by $s_1^I[k]$, is generated by the data combination and parallel-to-serial conversion module 145 according to:

$$s_1^I[k] = \cos\left(\frac{2\pi k}{M}\right) y_1^I[k] + \sin\left(\frac{2\pi k}{M}\right) y_1^I\left[M/2-k+M\left\lfloor\frac{k}{(M/2)}\right\rfloor\right],$$
$$k = 0, 1, 2, K, M-1,$$

where $\lfloor k/(M/2)\rfloor=0$ in case k<M/2, and $\lfloor k/(M/2)\rfloor=1$ in case k≥M/2.

The adder 146 is coupled to the IDHT module 143 and the data combination and parallel-to-serial conversion module 145, and generates the I-channel Tx baseband signal, which is represented by $s^I[k]$ hereinafter, by adding the first part $s_0^I[k]$ and the second part $s_1^I[k]$ of the I-channel Tx baseband signal together.

As a result, the I-channel Tx baseband signal can be represented by $s^I[k]=s_0^I[k]+s_1^I[k]$, $k=0,1,2,K,M-1$, and $$s^I[k] = \sum_{n=-\infty}^{\infty} \sum_{m=0}^{M-1} X_{m,n}^I p_m[k-nM] cas\left(\frac{2\pi mk}{M}\right)$$

$$= \sum_{n=-\infty}^{\infty} \sum_{\alpha=0}^{M/2-1} \sum_{\beta=0}^{1} X_{2\alpha+\beta,n}^I p_{2\alpha+\beta}[k-nM] cas\left(\frac{2\pi(2\alpha+\beta)k}{M}\right)$$

$$= \underbrace{\sum_{\alpha=0}^{M/2-1} \left(\sum_{n=-\infty}^{\infty} X_{2\alpha,n}^I p_0[k-nM]\right) cas\left(\frac{2\pi k\alpha}{M/2}\right)}_{s_0^I[k]}$$

$$+ \underbrace{\sum_{\alpha=0}^{M/2-1} \left(\sum_{n=-\infty}^{\infty} X_{2\alpha+1,n}^I p_1[k-nM]\right) cas\left(\frac{2\pi\alpha k}{M/2}+\frac{2\pi k}{M}\right)}_{s_1^I[k]}$$

where $\alpha \in \{0,1,2,K,M/2-1\}$; $\beta \in \{0,1\}$; $p_{2\alpha}[k]=p_0[k]$ represents one of the M/2 prototype filters 142 that is for a $12\alpha^{th}$ one of the subcarriers; and $p_{2\alpha+1}[k]=p_1[k]$ represents one of the M/2 prototype filters 142' that is for a $(2\alpha+1)^{th}$ one of the subcarriers. The first part of the I-channel Tx baseband signal, $s_0^I[k]$, can be obtained by performing M/2-point IDHT operations on $\{Y_{0,\alpha}^I[0],Y_{0,\alpha}^I[1],K,Y_{0,\alpha}^I[M/2-1]\}$ and $\{Y_{0,\alpha}^I[M/2],Y_{0,\alpha}^I[M/2+1],K,Y_{0,\alpha}^I[M-1]\}$. The second part of the I-channel Tx baseband signal, $s_1^I[k]$, can be obtained by appropriate data combination of those results of performing M/2-point IDHTs on $\{Y_{1,\alpha}^I[0],Y_{1,\alpha}^I[1],K,Y_{1,\alpha}^I[M/2-1]\}$ and $\{Y_{1,\alpha}^I[M/2],Y_{1,\alpha}^I[M/2+1],K,Y_{1,\alpha}^I[M-1]\}$.

Figure 3:
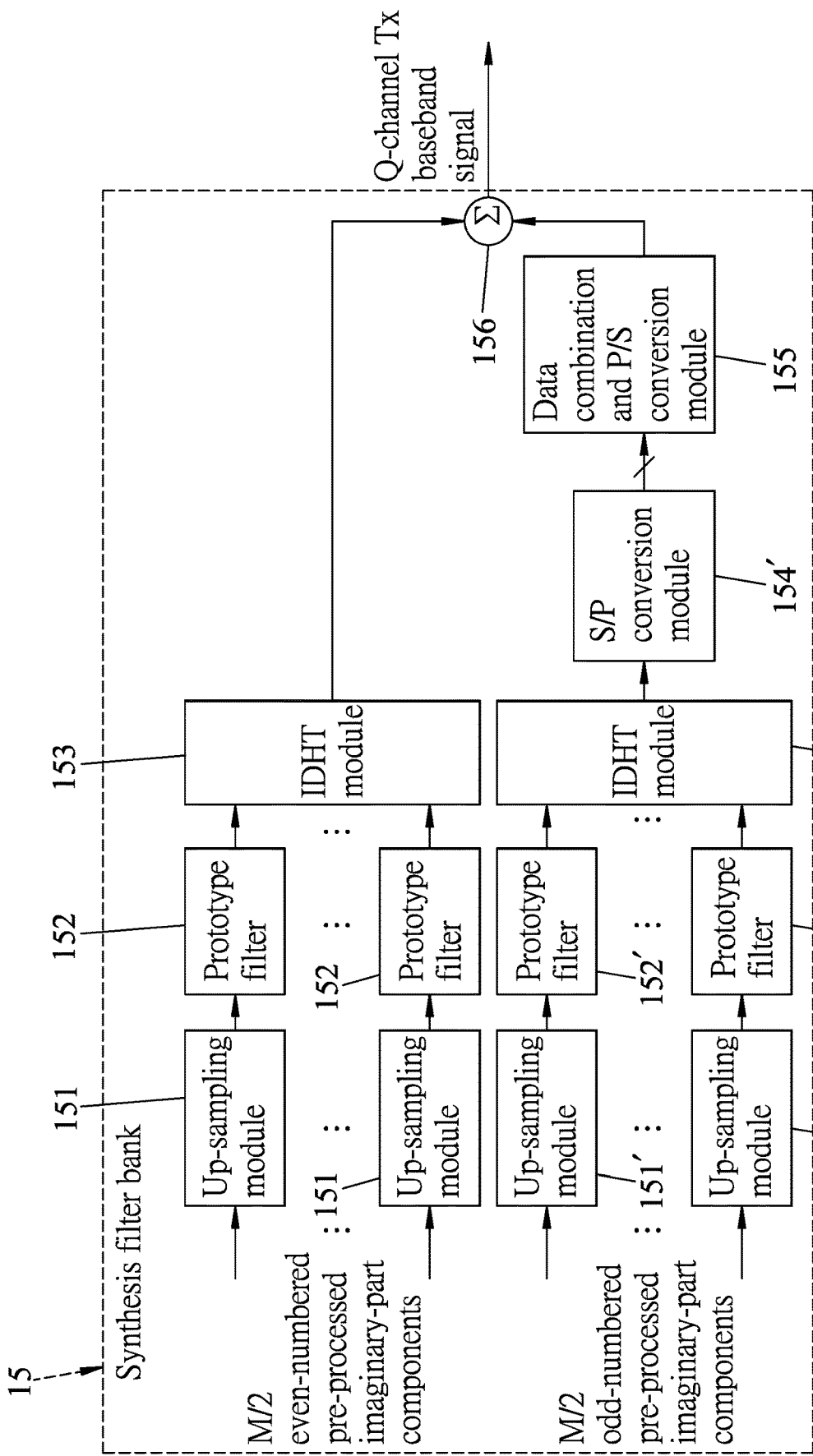
Figure 4:
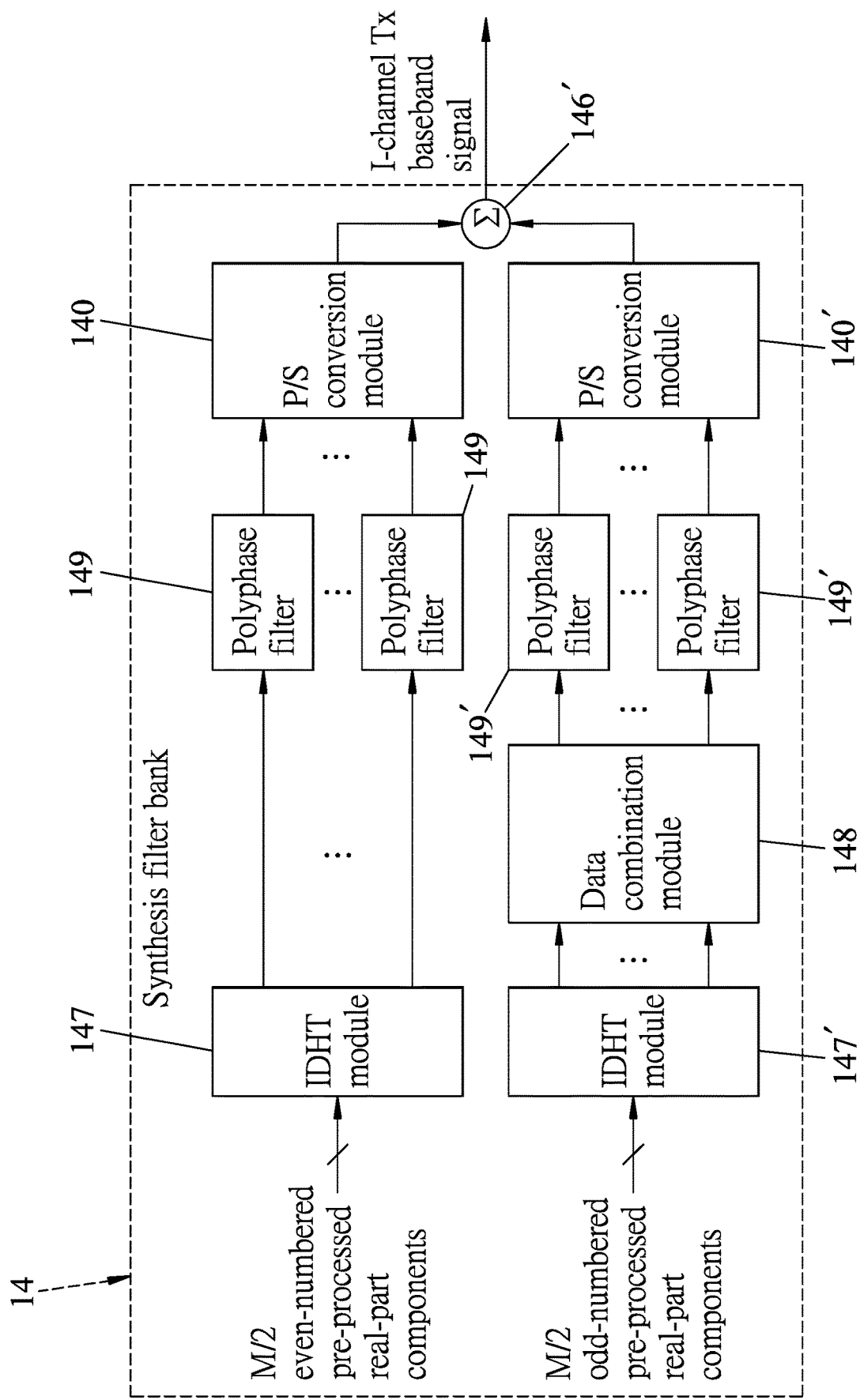
FIGS. 4 and 5 are block diagrams illustrating second implementations of the synthesis filter banks of the embodiment.

Referring to FIG. 3, the first implementation of the synthesis filter bank 15 is similar to that of the synthesis filter bank 14 shown in FIG. 2, and includes M/2 up-sampling modules 151, M/2 up-sampling modules 151', M/2 prototype filters 152, M/2 prototype filters 152', two IDHT modules 153, 153', a serial-to-parallel conversion module 154', a data combination and parallel-to-serial conversion module 155, and an adder 156.

The M/2 up-sampling modules 151 are coupled to the data separator 10' (see FIG. 1) for respectively receiving the M/2 even-numbered pre-processed imaginary-part components, and each of them performs up-sampling operations on the corresponding received even-numbered pre-processed imaginary-part component by a factor of M.

The M/2 up-sampling modules 151' are coupled to the data separator 10' (see FIG. 1) for respectively receiving the M/2 odd-numbered pre-processed imaginary-part components, and each of them performs up-sampling operations on the corresponding received odd-numbered pre-processed imaginary-part component by a factor of M.

The M/2 prototype filters 152 are respectively coupled to the M/2 up-sampling modules 151 for respectively receiving the M/2 even-numbered pre-processed imaginary-part components that have been up-sampled by the M/2 up-sampling modules 151. Each of the prototype filters 152 performs filtering on the respective one of the M/2 even-numbered pre-processed imaginary-part components that has been up-sampled.

The M/2 prototype filters 152' are respectively coupled to the M/2 up-sampling modules 151' for respectively receiving the M/2 odd-numbered pre-processed imaginary-part components that have been up-sampled by the M/2 up-sampling modules 151'. Each of the prototype filters 152' performs filtering on the respective one of the M/2 odd-numbered pre-processed imaginary-part components that has been up-sampled.

In this embodiment, the prototype filters 152 are identical (denoted by $p_0[k]$ and the prototype filters 152' are identical (denoted by $p_1[k]$), where $p_0[k]$ is orthogonal or nearly orthogonal to $p_1[k]$. The prototype filter $p_0[k]$ may be realized by the root raised cosine function, half-cosine function, extended Gaussian function, isotropic orthogonal transform algorithm, or physical layer for dynamic access and cognitive radio (PHYDYAS) filter, while the prototype filter $p_1[k]$ may be designed based on $p_0[k]$ to minimize ISI and ICI, and vice versa. The length of each of the prototype filters $p_0[k]$ and $p_1[k]$ is represented by L, and its value may be L=KM, L=KM-1, or L=KM+1, where K is a positive integer called an overlapping factor. However, this disclosure is not limited in each of the above respects.

The IDHT module 153 is coupled to the M/2 prototype filters 152 for receiving, in parallel, the M/2 even-numbered pre-processed imaginary-part components that have been up-sampled by the M/2 up-sampling modules 151 and filtered by the M/2 prototype filters 152. For two sets of the M/2 even-numbered pre-processed imaginary-part components that have been up-sampled and filtered and that are consecutively received by the IDHT module 153, the IDHT module 153 consecutively generates two serial third-IDHT results of M/2 points (for each serial third-IDHT result of M/2 points, the M/2 points are outputted in series), which serve as a first part of the Q-channel Tx baseband signal, by performing M/2-point IDHTs on the two sets of the M/2 even-numbered pre-processed imaginary-part components that have been up-sampled and filtered and that are received by the IDHT module 153 consecutively.

The IDHT module 153' is coupled to the M/2 prototype filters 152' for receiving, in parallel, the M/2 odd-numbered pre-processed imaginary-part components that have been filtered by the prototype filters 152'. For two sets of the M/2 odd-numbered pre-processed imaginary-part components that have been up-sampled and filtered and that are consecutively received by the IDHT module 153', the IDHT module 153' consecutively generates two serial fourth-IDHT results of M/2 points (for each serial fourth-IDHT result of M/2 points, the M/2 points are outputted in series) by performing M/2-point IDHTs on the two sets of the M/2 odd-numbered pre-processed imaginary-part components that have been up-sampled and filtered and that are received by the IDHT module 153' consecutively.

The serial-to-parallel conversion module 154' is coupled to the IDHT module 153' for receiving the two serial fourth-IDHT results of M/2 points, and consecutively outputs two parallel fourth-IDHT results of M/2 points (the M/2 points of each parallel fourth-IDHT result are outputted in parallel) by performing serial-to-parallel conversion on each of the two serial fourth-IDHT results of M/2 points.

The data combination and parallel-to-serial conversion module 155 is coupled to the serial-to-parallel conversion module 154' for receiving the two parallel fourth-IDHT results of M/2 points, and generates a second part of the Q-channel Tx baseband signal by, for each of the two parallel fourth-IDHT result of M/2 points, performing data combination on the parallel fourth-IDHT result of M/2 points to obtain a data combination result, and performing parallel-to-serial conversion on the data combination result for the parallel fourth-IDHT result of M/2 points.

The adder 156 is coupled to the IDHT module 153 and the data combination and parallel-to-serial conversion module 155, and generates the Q-channel Tx baseband signal, which is represented by $s^Q[k]$ hereinafter, by adding together the first part and the second part of the Q-channel Tx baseband signal, which are hereinafter represented by $s_0^Q[k]$ and $s_1^Q[k]$, respectively.

It is noted that operations of the IDHT modules 153, 153', the serial-to-parallel conversion module 154', the data combination and parallel-to-serial conversion module 155 and the adder 156 are similar to operations of the IDHT modules 143, 143', the serial-to-parallel conversion module 144', the data combination and parallel-to-serial conversion module 145 and the adder 146, so details thereof are not repeated herein for the sake of brevity.

As a result, the Q-channel Tx baseband signal can be represented by $s^Q[k]=s_0^Q[k]+s_1^Q[k]$, $k=0,1,2,K,M-1$, and $$s^Q[k] = \sum_{n=-\infty}^{\infty} \sum_{m=0}^{M-1} X_{m,n}^Q p_m[k-nM] cas\left(\frac{2\pi mk}{M}\right)$$

$$= \sum_{n=-\infty}^{\infty} \sum_{\alpha=0}^{M/2-1} \sum_{\beta=0}^{1} X_{2\alpha+\beta,n}^Q p_{2\alpha+\beta}[k-nM] cas\left(\frac{2\pi(2\alpha+\beta)k}{M}\right)$$

$$= \underbrace{\sum_{\alpha=0}^{M/2-1}\left(\sum_{n=-\infty}^{\infty} X_{2\alpha,n}^Q p_0[k-nM]\right)cas\left(\frac{2\pi k\alpha}{M/2}\right)}_{s_0^Q[k]}$$

$$+ \underbrace{\sum_{\alpha=0}^{M/2-1}\left(\sum_{n=-\infty}^{\infty} X_{2\alpha+1,n}^Q p_1[k-nM]\right)cas\left(\frac{2\pi\alpha k}{M/2}+\frac{2\pi k}{M}\right)}_{s_1^Q[k]}$$

where $\alpha\in\{0,1,2,K,M/2-1\}$; $\beta\in\{0,1\}$; $p_{2\alpha}[k]=p_0[k]$ represents one of the M/2 prototype filters 152 that is for a $2\alpha^{th}$ one of the subcarriers; $p_{2\alpha+1}[k]=p_1[k]$ represents one of the M/2 prototype filters 152' that is for a $(2\alpha+1)^{th}$ one of the subcarriers;

$$Y_{0,\alpha}^Q[k] = \sum_{n=-\infty}^{\infty} X_{2\alpha,n}^Q p_0[k-nM]$$

denotes a result obtained from $X_{2\alpha,n}^Q$ being up-sampled by one of the up-sampling modules 151 followed by being processed by one of the prototype filters 152, wherein $X_{2\alpha,n}^Q$ is an $\alpha^{th}$ one of the M/2 even-numbered pre-processed imaginary-part components; and $$Y_{1,\alpha}^Q[k] = \sum_{n=-\infty}^{\infty} X_{2\alpha+1,n}^Q p_1[k-nM]$$

denotes a result obtained from $X_{2\alpha+1}^Q$ being up-sampled by one of the up-sampling modules 151' followed by being processed by one of the prototype filters 152', wherein $X_{2\alpha+1,n}^Q$ is an $\alpha^{th}$ one of the M/2 odd-numbered pre-processed imaginary-part components. The first part of the Q-channel Tx baseband signal, $s_0^Q[k]$, can be obtained by performing M/2-point IDHTs on $\{Y_{0,\alpha}^Q[0],Y_{0,\alpha}^Q[1],K,Y_{0,\alpha}^Q[M/2-1]\}$ and $\{Y_{0,\alpha}^Q[M/2],Y_{0,\alpha}^Q[M/2+1],K,Y_{0,\alpha}^Q[M-1]\}$. The second part of the Q-channel Tx baseband signal, $s_1^Q[k]$, can be obtained by appropriate data combination of those results of performing M/2-point IDHTs on $\{Y_{1,\alpha}^Q[0],Y_{1,\alpha}^Q[1],K,Y_{1,\alpha}^Q[M/2-1]\}$ and $\{Y_{1,\alpha}^Q[M/2], Y_{1,\alpha}^Q[M/2+1],K,Y_{1,\alpha}^Q[M-1]\}$. Note that each of the M/2 prototype filters 152 ($p_0[k]$) corresponding to even-numbered subcarriers is orthogonal or nearly orthogonal to each of the M/2 prototype filters 152' ($p_1[k]$) corresponding to the odd-numbered subcarriers, so as to lessen ISI and ICI.

In this embodiment, each of the synthesis filter banks 14, 15 may be implemented by an equivalent structure that includes M synthesis filters. The synthesis filter bank 14 includes a first synthesis filter group of M/2 synthesis filters respectively corresponding to M/2 subcarriers for the M/2 even-numbered pre-processed real-part components, and a second synthesis filter group of M/2 synthesis filters respectively corresponding to M/2 subcarriers for the M/2 odd-numbered pre-processed real-part components. The synthesis filter bank 15 includes a third synthesis filter group of M/2 synthesis filters respectively corresponding to M/2 subcarriers for the M/2 even-numbered pre-processed imaginary-part components, and a fourth synthesis filter group of M/2 synthesis filters respectively corresponding to M/2 subcarriers for the M/2 odd-numbered pre-processed imaginary-part components. For each of the synthesis filter banks 14, 15, one of the synthesis filters that corresponds to a $(2\alpha+\beta)^{th}$ one of the subcarriers is represented by $p_\beta[k]cas(2\pi\alpha k/(M/2))$ with the same length as that of each of the prototype filters 142, 142', 152, 152', where $\alpha\in\{0,1,2,K,M/2-1\}$, $\beta\in\{0,1\}$, and $k=0, 1, 2, \ldots, L-1$. For ease of presentation, an assumption of $L=KM$ is made in the following derivations, and the results for $L=KM$ can be easily extended to cases where $L=KM+1$ and $L=KM-1$, where K is the overlapping factor. Each of the first, second, third and fourth synthesis filter groups has a system function $F_{\beta,\alpha}(z)$ that is obtained from a z-transform of $p_\beta[k]cas(2\pi\alpha k/(M/2))$, $k=0, 1, 2, \ldots, L-1$. Based on the periodicity of $cas(2\pi\alpha k/(M/2))$, each of the prototype filters 142, 142' of length KM can be separated into 2K segments, in which each segment is multiplied by a full period of the cas function. In other words, each of the first, second, third and fourth synthesis filter groups can be decomposed into M/2 polyphase filters each having a length of 2K. The system function is represented by:

$$F_{\beta,\alpha}(z) = \sum_{q=0}^{M/2-1} \psi_{\alpha,q} P_\beta^{(q)}(z^{M/2})z^{-q},$$

where $\alpha,q\in\{0,1,2,K,M/2-1\}$; $\beta\in\{0,1\}$; $\psi_{\alpha,q}=cas(2\pi\alpha q/(M/2))$ represents a kernel function of an M/2-point IDHT; and $$P_\beta^{(q)}(z^{M/2}) = \sum_{r=0}^{2K-1} p_\beta[q+r(M/2)]z^{-r(M/2)}$$

represents a $q^{th}$ one of the polyphase filters in the corresponding one of the first ($\beta=0$), second ($\beta=1$), third ($\beta=0$) and fourth ($\beta=1$) synthesis filter groups. Using matrix-vector notations, the system function of each of the first, second, third and fourth synthesis filter groups can be represented by:

$$F_\beta(Z)=[F_{\beta,0}(z)F_{\beta,1}(z)KF_{\beta,M/2-1}(z)]^T=\psi\cdot P_\beta(z^{M/2})\cdot c(z),$$

where $\beta\in\{0,1\}$; $\psi$ is an M/2-by-M/2 matrix with $[\psi]_{\alpha,q}=\psi_{\alpha,q}$, $\alpha,q\in\{0,1,2K,M/2-1\}$, $P_\beta(z^{M/2})=diag[P_\beta^{(0)}(z^{M/2})\ P_\beta^{(1)}$ $(z^{M/2})K\ P_\beta^{(M/2-1)}(z^{M/2})]$ is a diagonal matrix; and $c(z)=[1\ z^{-1}\ \ldots\ z^{-(M/2-1)}]^T$. As a result, the z-transforms of the outputs of the IDHT modules 143, 143', which are respectively represented by $y_0^I[k]$ and $y_1^I[k]$, can be represented by:

$$Y_0^I(z) = F_0^T(z) \cdot X_0^I(z^M) = [\psi \cdot P_0(z^{M/2}) \cdot c(z)]^T \cdot X_0^I(z^M) = c^T(z) \cdot P_0(z^{M/2}) \cdot \psi \cdot X_0^I(z^M),$$

and $$Y_1^I(z) = F_1^T(z) \cdot X_1^I(z^M) = [\psi \cdot P_1(z^{M/2}) \cdot c(z)]^T \cdot X_1^I(z^M) = c^T(z) \cdot P_1(z^{M/2}) \cdot \psi \cdot X_1^I(z^M),$$

where $Y_0^I(z)$ represents a z-transform of $y_0^I[k]$; $Y_1^I(z)$ represents a z-transform of $y_1^I[k]$; (z) represents a z-transform of an input of one of the synthesis filters; $X_1^I(z^M)$ represents a z-transform of an input of one of the synthesis filters which has been up-sampled by a factor of M; $X_0^I(z^M) = [X_0^I(z^M)\ X_2^I(z^M)\ K\ X_{M-2}^I(z^M)]^T$; and $X_1^I(z^M) = [X_1^I(z^M)\ X_3^I(z^M)\ K\ X_{M-1}^I(z^M)]^T$. Similarly, a z-transform of the output of the IDHT module 153 ($y_0^Q[k]$) and a z-transform of the output of the IDHT module 153' ($y_1^Q[k]$) also have similar representations, and they can be represented by $Y_0^Q(z)$ and $Y_1^Q(z)$, respectively. Based on the above-mentioned results and multirate noble identities, the first implementations of the synthesis filter banks 14, 15 (see FIGS. 2 and 3) can be transformed into the second implementations of the synthesis filter banks 14, 15 (see FIGS. 4 and 5), which are called polyphase implementation structures and have lower computational complexity in comparison to the first implementations.

Referring to FIG. 4, the second implementation of the synthesis filter bank 14 includes two IDHT modules 147, 147', a data combination module 148, M/2 different polyphase filters 149, M/2 different polyphase filters 149', two parallel-to-serial conversion modules 140, 140', and an adder 146'.

The IDHT module 147 is coupled to the data separator (see FIG. 1) for receiving the M/2 even-numbered pre-processed real-part components, and generates a first-IDHT result of M/2 points by performing an M/2-point IDHT on the M/2 even-numbered pre-processed real-part components.

The IDHT module 147' is coupled to the data separator (see FIG. 1) for receiving the M/2 odd-numbered pre-processed real-part components, and generates a second-IDHT result of M/2 points by performing an M/2-point IDHT on the M/2 odd-numbered pre-processed real-part components.

The data combination module 148 is coupled to the IDHT module 147' for receiving the second-IDHT result of M/2 points, and performs data combination, which is similar to what is done by the data combination and parallel-to-serial conversion module 145 shown in FIG. 2, on the second-IDHT result of M/2 points.

Each of the M/2 polyphase filters 149 is coupled to the IDHT module 147 for receiving a respective one of the M/2 points of the first-IDHT result. The polyphase filters 149 respectively generate M/2 first filtered outputs. Each of the polyphase filters 149 generates the respective one of the first filtered outputs by sequentially performing up-sampling by a factor of two and filtering on the respective one of the M/2 points of the first-IDHT result received thereby. In this embodiment, the M/2 polyphase filters 149 correspond to the first synthesis filter group as described hereinbefore.

Each of the M/2 polyphase filters 149' is coupled to the data combination module 148 for receiving a respective one of the M/2 points of the second-IDHT result on which the data combination has been performed. The polyphase filters 149' respectively generate M/2 second filtered outputs. Each of them generates the respective one of the second filtered outputs by sequentially performing up-sampling by a factor of two and filtering on the respective one of the M/2 points of the second-IDHT result (on which the data combination has been performed) received thereby. In this embodiment, the M/2 polyphase filters 149' correspond to the second synthesis filter group as described hereinbefore.

The parallel-to-serial conversion module 140 is coupled to the M/2 polyphase filters 149 for receiving the M/2 first filtered outputs, and generates a first part of the I-channel Tx baseband signal ($s_0^I[k]$) by sequentially performing up-sampling by a factor of M/2 and parallel-to-serial conversion on the M/2 first filtered outputs.

The parallel-to-serial conversion module 140' is coupled to the M/2 polyphase filters 149' for receiving the M/2 second filtered outputs, and generates a second part of the I-channel Tx baseband signal ($s_1^I[k]$) by sequentially performing up-sampling by a factor of M/2 and parallel-to-serial conversion on the M/2 second filtered outputs.

The adder 146' is coupled to the parallel-to-serial conversion modules 140, 140', and generates the I-channel Tx baseband signal by adding the first part and the second part of the I-channel Tx baseband signal together (i.e., $s^I[k] = s_0^I[k] + s_1^I[k]$).

Figure 5:
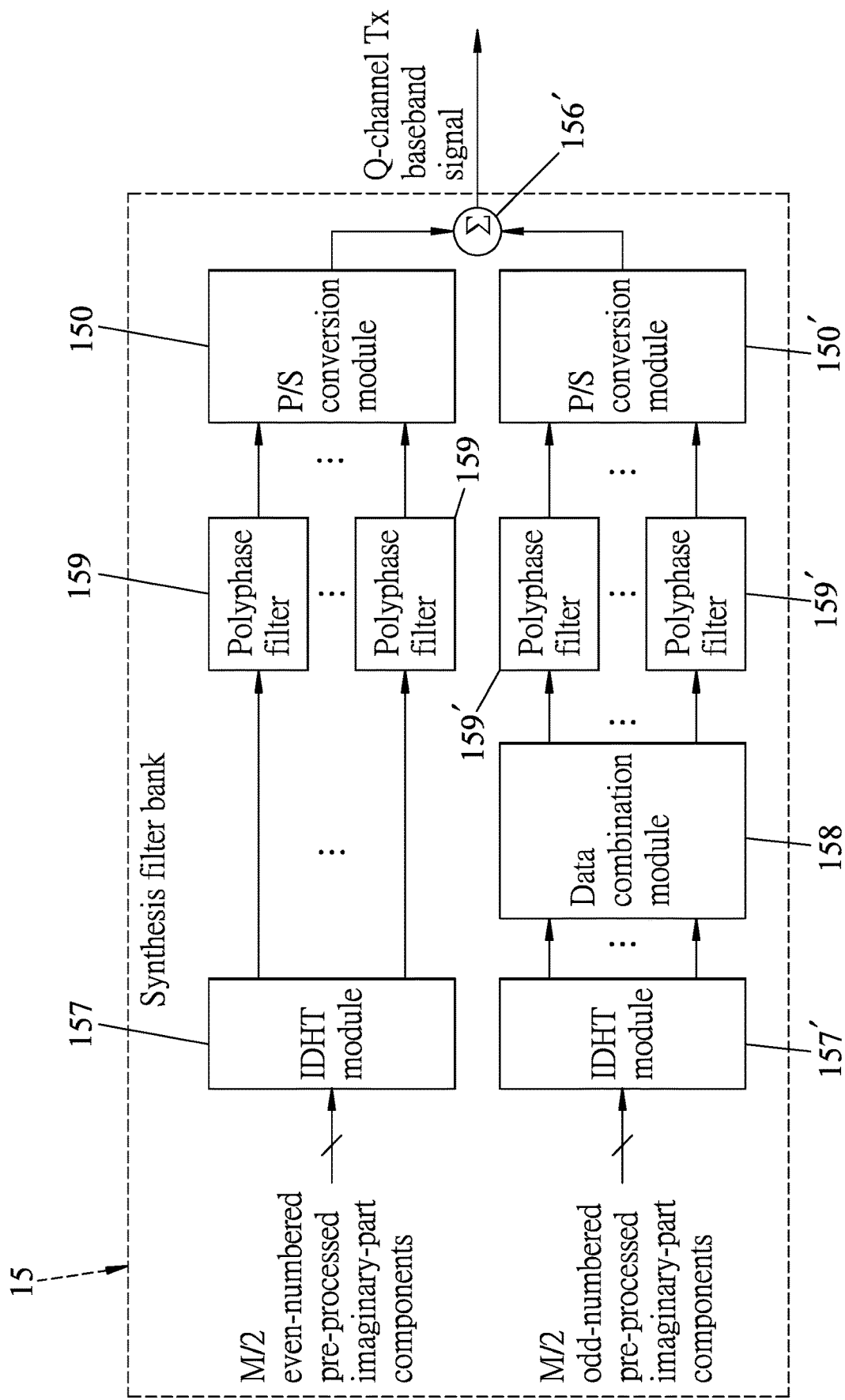

Referring to FIG. 5, the second implementation of the synthesis filter bank 15 is similar to the second implementation of the synthesis filter bank 14 as shown in FIG. 4, and includes two IDHT modules 157, 157', a data combination module 158, M/2 different polyphase filters 159, M/2 different polyphase filters 159', two parallel-to-serial conversion modules 150, 150', and an adder 156'. In this embodiment, the M/2 polyphase filters 159 correspond to the third synthesis filter group, and the M/2 polyphase filters 159' correspond to the fourth synthesis filter group, as described hereinbefore. The synthesis filter bank 15 generates a first part and a second part of the Q-channel Tx baseband signal ($s_0^Q[k]$, $s_1^Q[k]$) in a similar manner to that in which the synthesis filter bank 14 generates the first part and the second part of the I-channel Tx baseband signal ($s_0^I[k]$, $s_1^I[k]$), so details thereof are not repeated herein for the sake of brevity.

Referring to FIG. 1 again, the receiver end 2 receives a serial I-channel Rx (meaning received) baseband signal (first-channel Rx baseband signal) of M points and a serial Q-channel Rx baseband signal (second-channel Rx baseband signal) of M points, and generates a series of M complex output data symbols based on the serial I-channel and Q-channel Rx baseband signals. It is noted that the I-channel Rx baseband signal and the Q-channel Rx baseband signal received by the receiver end 2 include channel noise in addition to the I-channel Tx baseband signal and the Q-channel Tx baseband signal transmitted at the transmitter end 1. The receiver end 2 includes two analysis filter banks 21, 22, a data detection unit 23, two data combiners 24, 24', two post-processing units 25, 25', and a parallel-to-serial unit 26. For ease of presentation, the serial I-channel Rx baseband signal is regarded as two consecutively received serial I-channel Rx baseband signals of M/2 points, and the serial Q-channel Rx baseband signal is regarded as two consecutively received serial Q-channel Rx baseband signals of M/2 points.

The analysis filter bank 21 is disposed to consecutively receive the two serial I-channel Rx baseband signals of M/2 points, where the M/2 points of each serial I-channel Rx baseband signal are received in series, and generates a first part and a second part of a filtered I-channel Rx baseband signal by performing at least serial-to-parallel conversion, down-sampling, filtering, data combination and DHT on the two serial I-channel Rx baseband signals of M/2 points. In this embodiment, the first part of the filtered I-channel Rx baseband signal has M/2 components, and corresponds to the M/2 even-numbered pre-processed real-part components as described for the transmitter end 1; and the second part of the filtered I-channel Rx baseband signal has M/2 components, and corresponds to the M/2 odd-numbered pre-processed real-part component as described for the transmitter end 1. However, this disclosure is not limited in this respect.

The analysis filter bank 22 is disposed to consecutively receive the two serial Q-channel Rx baseband signals of M/2 points, where the M/2 points of each serial Q-channel Rx baseband signal are received in series, and generates a first part and a second part of a filtered Q-channel Rx baseband signal by performing at least serial-to-parallel conversion, down-sampling, filtering, data combination and DHT on the two serial Q-channel Rx baseband signals of M/2 points. In this embodiment, the first part of the filtered Q-channel Rx baseband signal has M/2 components, and corresponds to the M/2 even-numbered pre-processed imaginary-part components as described for the transmitter end 1; and the second part of the filtered Q-channel Rx baseband signal has M/2 components, and corresponds to the M/2 odd-numbered pre-processed imaginary-part component as described for the transmitter end 1. However, this disclosure is not limited in this respect.

Figure 6:
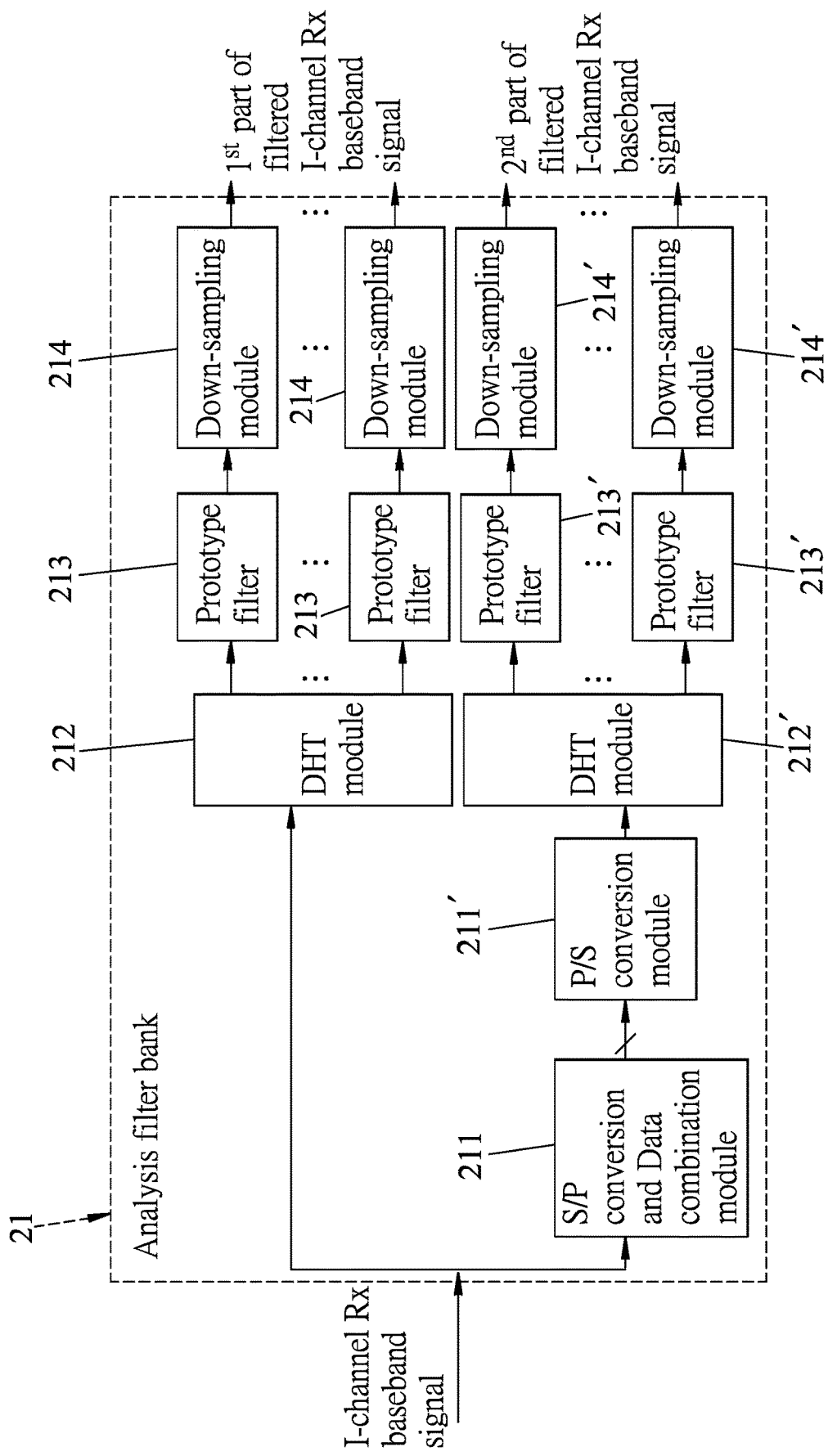
FIGS. 6 and 7 are block diagrams illustrating first implementations of analysis filter banks of the embodiment.

In this embodiment, two exemplary implementations for each of the analysis filter banks 21, 22 are provided. FIGS. 6 and 8 respectively illustrate first and second exemplary implementations of the analysis filter bank 21, and FIGS. 7 and 9 respectively illustrate first and second exemplary implementations of the analysis filter bank 22.

Referring to FIG. 6, the first implementation of the analysis filter bank 21 includes a serial-to-parallel conversion and data combination module 211, a parallel-to-serial conversion module 211', two DHT modules 212, 212', M/2 prototype filters 213 (similar to the M/2 prototype filters 142), M/2 prototype filters 213' (similar to the M/2 prototype filters 142'), M/2 down-sampling modules 214, and M/2 down-sampling modules 214'.

The serial-to-parallel conversion and data combination module 211 is disposed to receive the two serial I-channel Rx baseband signals of M/2 points, and consecutively outputs two parallel I-channel Rx combination signals of M/2 points (the M/2 points of each parallel I-channel Rx combination signal are outputted in parallel) by sequentially performing serial-to-parallel conversion and data combination on each of the two serial I-channel Rx baseband signals, wherein the data combination is done in a similar manner to that performed by the data combination and parallel-to-serial conversion module 145 as described for the transmitter end 1.

The parallel-to-serial conversion module 211' is coupled to the serial-to-parallel conversion and data combination module 211 for receiving the two parallel I-channel Rx combination signals of M/2 points, and consecutively outputs two serial I-channel Rx combination signals of M/2 points (the M/2 points of each serial I-channel Rx combination signal are outputted in series) by performing parallel-to-serial conversion on each of the two parallel I-channel Rx combination signals of M/2 points.

The DHT module 212 is disposed to receive the two serial I-channel Rx baseband signals of M/2 points, and consecutively generates two first DHT intermediate results of M/2 points by, for each of the two serial I-channel Rx baseband signals of M/2 points, multiplying the serial I-channel Rx baseband signal of M/2 points with all M/2 points of a kernel function of an M/2-point DHT, which is similar to multiplication of an exponential kernel function at the receiver end of a conventional DFT-based FBMC/OQAM system. For each of the first DHT intermediate results of M/2 points, the M/2 points of the first DHT intermediate result correspond to all elements of the product of multiplication during DHT performed by the DHT module 212.

The DHT module 212' is coupled to the parallel-to-serial conversion module 211' for receiving the two serial I-channel Rx combination signals of M/2 points, and consecutively generates two second DHT intermediate results of M/2 points by, for each of the two serial I-channel Rx combination signals of M/2 points, multiplying the serial first-channel Rx combination signal of M/2 points with all the M/2 points of the kernel function of an M/2-point DHT. For each of the second DHT intermediate results of M/2 points, the M/2 points of the second DHT intermediate result correspond to all elements of the product of multiplication in the DHT performed by the DHT module 212'.

Each of the M/2 prototype filters 213 is coupled to the DHT module 212 for receiving a respective one of the M/2 points of each of the two first DHT intermediate results. The M/2 prototype filters 213 generate two filtered first DHT intermediate results of M/2 points, wherein each filtered first DHT intermediate result of M/2 points is generated by the M/2 prototype filters 213 each performing filtering on the respective one of the M/2 points of a corresponding one of the two first DHT intermediate results. During the filtering, addition operations of the DHT performed by the DHT module 212 may be performed at the same time. Operations of the prototype filters 213 are similar to those of the prototype filters 142 as described for the transmitter end 1, so details thereof are omitted herein for the sake of brevity.

Each of the M/2 prototype filters 213' is coupled to the DHT module 212' for receiving a respective one of the M/2 points of each of the two second DHT intermediate results. The M/2 prototype filters 213' generate two filtered second DHT intermediate results of M/2 points, wherein each filtered second DHT intermediate result of M/2 points is generated by the M/2 prototype filters 213' each performing filtering on the respective one of the M/2 points of a corresponding one of the two second DHT intermediate results. During the filtering, addition of the DHT performed by the DHT module 212' may be performed at the same time. Operations of the prototype filters 213' are similar to those of the prototype filters 142' as described for the transmitter end 1, so details thereof are omitted herein for the sake of brevity.

It is noted that each of the M/2 prototype filters 213 (similar to each of the M/2 prototype filters 142) is orthogonal or nearly orthogonal to each of the M/2 prototype filters 213' (similar to each of the M/2 prototype filters 142'), so as to lessen ISI and ICI. In this embodiment, $p_0[k]$ and $p_1[k]$ described for the synthesis filter banks 14, 15 are used for each of the M/2 prototype filters 213 and each of the M/2 prototype filters 213', respectively.

The M/2 down-sampling modules 214 are respectively coupled to the M/2 prototype filters 213 for respectively receiving the M/2 points of each of the two filtered first DHT intermediate results, and generate the first part of the filtered I-channel Rx baseband signal by each performing, for each of the two filtered first DHT intermediate results, down-sampling on the respective one of the M/2 points of the filtered first DHT intermediate result by a factor of M.

The M/2 down-sampling modules 214' are respectively coupled to the M/2 prototype filters 213' for respectively receiving the M/2 points of each of the two filtered second DHT intermediate results, and generate the second part of the filtered I-channel Rx baseband signal by each performing, for each of the two filtered second DHT intermediate results, down-sampling on the respective one of the M/2 points of the filtered second DHT intermediate result by a factor of M.

Figure 7:
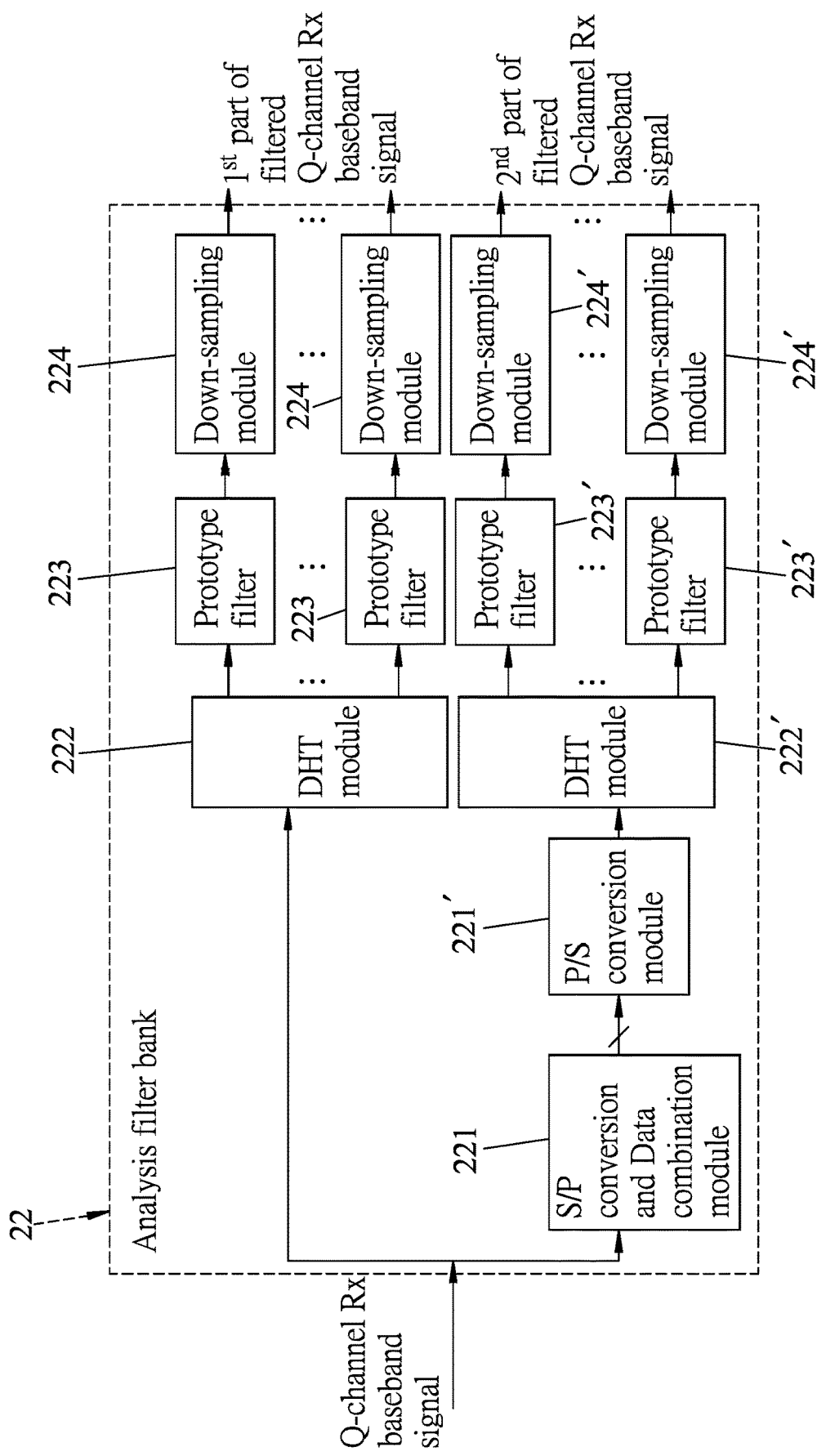
Figure 8:
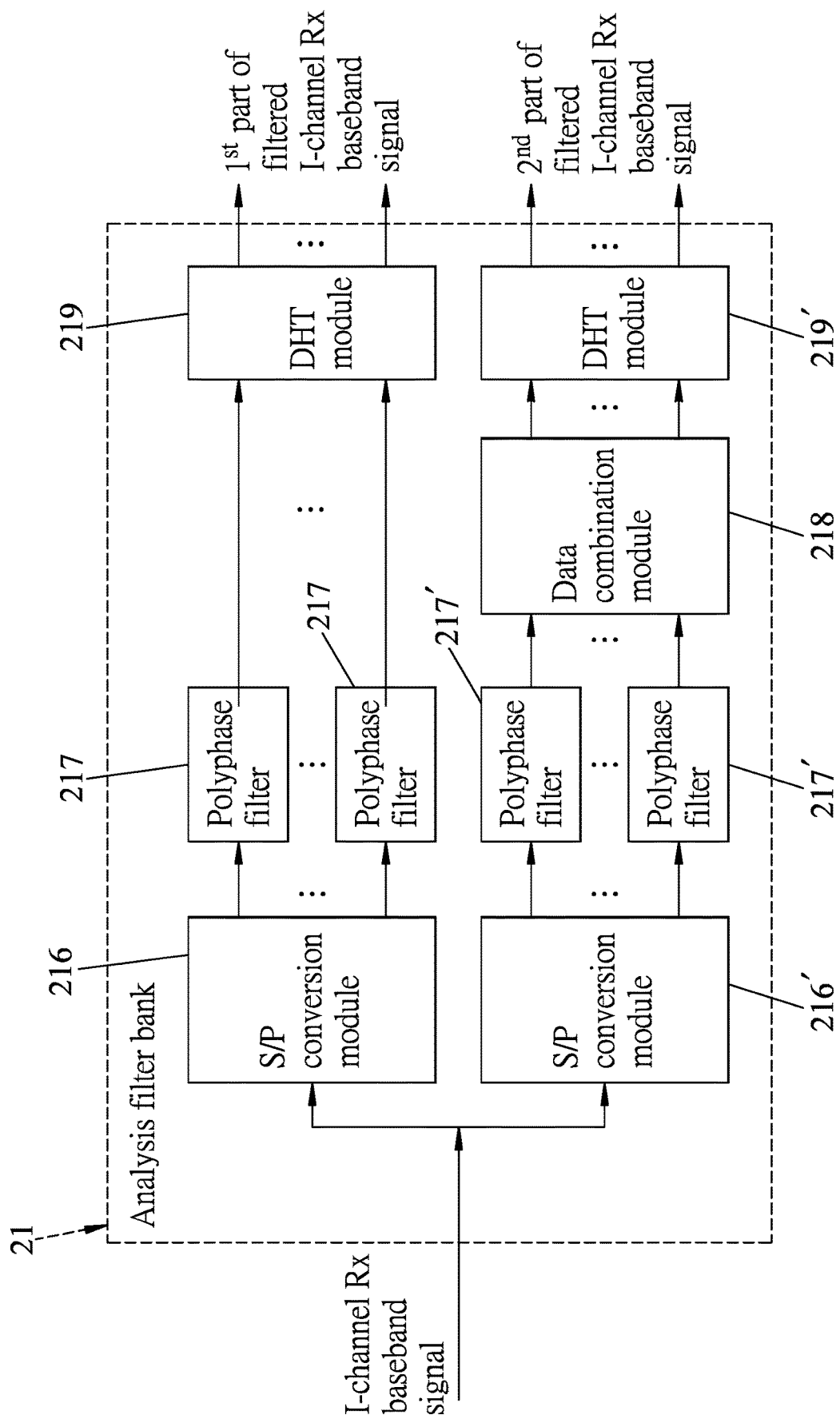
FIGS. 8 and 9 are block diagrams illustrating second implementations of the analysis filter banks of the embodiment.

Referring to FIG. 7, the first implementation of the analysis filter bank 22 is shown to be similar to the first implementation of the analysis filter bank 21 (see FIG. 6), and includes a serial-to-parallel conversion and data combination module 221, a parallel-to-serial conversion module 221', two DHT modules 222, 222', M/2 prototype filters 223, M/2 prototype filters 223',M/2 down-sampling modules 224, and M/2 down-sampling modules 224'. The analysis filter bank 22 generates the first part and the second part of the filtered Q-channel Rx baseband signal in a similar manner to that in which the analysis filter bank 21 generates the first part and the second part of the filtered I-channel Rx baseband signal, so details thereof are not repeated herein for the sake of brevity.

In this embodiment, each of the analysis filter banks 21, 22 may be implemented by an equivalent structure that includes M analysis filters. The analysis filter bank 21 includes a first analysis filter group of M/2 analysis filters respectively corresponding to M/2 subcarriers for the M/2 components of the first part of the filtered I-channel Rx baseband signal, and a second analysis filter group of M/2 analysis filters respectively corresponding to M/2 subcarriers for the M/2 components of the second part of the filtered I-channel Rx baseband signal. The analysis filter bank 22 includes a third analysis filter group of M/2 analysis filters respectively corresponding to M/2 subcarriers for the M/2 components of the first part of the filtered Q-channel Rx baseband signal, and a fourth analysis filter group of M/2 analysis filters respectively corresponding to M/2 subcarriers for the M/2 components of the second part of the filtered Q-channel Rx baseband signal. For each of the analysis filter banks 21, 22, one of the analysis filters that corresponds to a $(2\alpha+\beta)^{th}$ one of the subcarriers is represented by $p_\beta[k]cas(2\pi\alpha k/(M/2))$ with the same length as that of each of the prototype filters 213, 213', 223, 223', where $\alpha \in \{0,1,2,K,M/2-1\}$, $\beta \in \{0,1\}$ and k=0, 1, 2, . . . , L−1. Each of the first, second, third and fourth analysis filter groups has a system function $G_{\beta,\alpha}(z)$ that is obtained from a z-transform of $p_\beta[k]cas(2\pi\alpha k/(M/2))$, k=0, 1, 2, . . . , L−1. Similar to those described for the transmitter end 1, each of the first, second, third and fourth analysis filter groups can be decomposed into M/2 polyphase filters each having a length of 2K. The system function is represented by:

$$G_{\beta,\alpha}(z) = \sum_{q=0}^{M/2-1} \psi_{\alpha,q} P_\beta^{(q)}(z^{M/2}) z^{-q},$$

where $\alpha,q \in \{0,1,2,K,M/2-1\}$; $\beta \in \{0,1\}$; $\psi_{\alpha,q}=cas(2\pi\alpha q/(M/2))$ represents a kernel function of an M/2-point DHT; and $$P_\beta^{(q)}(z^{M/2}) = \sum_{r=0}^{2K-1} p_\beta[q+r(M/2)] z^{-r(M/2)}$$

represents a $q^{th}$ one of the polyphase filters in the corresponding one of the first ($\beta=0$), second ($\beta=1$), third ($\beta=0$) and fourth ($\beta=1$) analysis filter groups. Using matrix-vector notations, the first part and the second part of the filtered I-channel Rx baseband signal can be represented by:

$$\tilde{X}_0^I(z^M)=[\psi \cdot P_0(z^{M/2} \cdot c(z))] \cdot \hat{Y}_0^I(z)$$

and $$\tilde{X}_1^I(z^M)=[\psi \cdot P_1(z^{M/2} \cdot c(z))] \cdot \hat{Y}_1^I(z)$$

where $\tilde{X}_0^I(z^M)$ consists of M/2 elements with each representing a z-transform of one point of the first part of the filtered I-channel Rx baseband signal; $\tilde{X}_1^I(z^M)$ consists of M/2 elements with each representing a z-transform of one point of the second part of the filtered I-channel Rx baseband signal; $\psi$ is an M/2-by-M/2 matrix with $[\psi]_{\alpha,q}=\omega_{\alpha,q} \in \{0, 1, 2, \ldots, M/2-1\}$; $P_\beta(z^{M/2})=diag[P_\beta^{(0)}(z^{M/2})\ P_\beta^{(1)}(z^{M/2}) \ldots P_\beta^{(M/2-1)}(z^{M/2})]$ is a diagonal matrix, $\beta \in \{0,1\}$; $c(z)= [1\ z^{-1}\ \ldots\ z^{-(M/2-1)}]^T$; $\hat{Y}_0^I(z)$ represents a z-transform corresponding to the filtered I-channel Rx baseband signal; and $\hat{Y}_1^I(z)$ represents a z-transform corresponding to the filtered I-channel Rx combination signal. Similarly, z-transforms of the first part and second part of the filtered Q-channel Rx baseband signal also have similar representations, and can be represented by $\tilde{X}_0^Q(z^M)$ and $\tilde{X}_1^Q(z^M)$, respectively. Based on the abovementioned results and multirate noble identities, the first implementations of the analysis filter banks 21, 22 (see FIGS. 6 and 7) can be transformed into the second implementations of the analysis filter banks 21, 22 (see FIGS. 8 and 9), which are called polyphase filtering architecture and which have lower computation complexity in comparison to the first implementations.

Referring to FIG. 8, the second implementation of the analysis filter bank 21 includes two serial-to-parallel conversion modules 216, 216', M/2 different polyphase filters 217, M/2 different polyphase filters 217', a data combination module 218, and two DHT modules 219, 219'.

The serial-to-parallel conversion module 216 is disposed to receive the two serial I-channel Rx baseband signals of M/2 points, and consecutively outputs two parallel first down-sampled I-channel Rx baseband signals of M/2 points (the M/2 points of each parallel first down-sampled I-channel Rx baseband signal are outputted in parallel) by sequentially performing serial-to-parallel conversion and down-sampling by a factor of M/2 on the serial I-channel Rx baseband signals of M/2 points.

The serial-to-parallel conversion module 216' is disposed to receive the two serial I-channel Rx baseband signals of M/2 points, and consecutively outputs two parallel second down-sampled I-channel Rx baseband signals of M/2 points (the M/2 points of each parallel second down-sampled I-channel Rx baseband signal are outputted in parallel) by sequentially performing serial-to-parallel conversion and down-sampling by a factor of M/2 on the serial I-channel Rx baseband signals of M/2 points.

Each of the M/2 polyphase filters 217 is coupled to the serial-to-parallel conversion module 216 for receiving a respective one of the M/2 points of each of the two parallel first down-sampled I-channel Rx baseband signals. The M/2 polyphase filters 217 generate a filtered first down-sampled I-channel Rx baseband signal of M/2 points in parallel, wherein one point of the filtered first down-sampled I-channel Rx baseband signal is generated by one of the M/2 polyphase filters 217 sequentially performing filtering and down-sampling by a factor of two on a sequence of signal points of the respective one of the M/2 points of each received parallel first down-sampled I-channel Rx baseband signal, where the sequence of signal points are consecutively received by the one of the M/2 polyphase filters 217 at consecutive time points. In this embodiment, the M/2 polyphase filters 217 correspond to the first analysis filter group as described hereinbefore.

Each of the M/2 polyphase filters 217' is coupled to the serial-to-parallel conversion module 216' for receiving a respective one of the M/2 points of each of the two parallel second down-sampled I-channel Rx baseband signals. The M/2 polyphase filters 217' generate a filtered second down-sampled I-channel Rx baseband signal of M/2 points in parallel, wherein one point of the filtered second down-sampled I-channel Rx baseband signal is generated by one of the M/2 polyphase filters 217' sequentially performing filtering and down-sampling by a factor of two on a sequence of signal points of the respective one of the M/2 points of each received parallel second down-sampled I-channel Rx baseband signal, where the sequence of signal points are consecutively received by the one of the M/2 polyphase filters 217' at consecutive time points. In this embodiment, the M/2 polyphase filters 217' correspond to the second analysis filter group as described hereinbefore.

The data combination module 218 is coupled to the M/2 polyphase filters 217' for receiving the filtered second down-sampled I-channel Rx baseband signal of M/2 points, and generates a down-sampled I-channel Rx combination signal of M/2 points by performing data combination on the received filtered signal of M/2 points, wherein the data combination is done in a similar manner to that performed by the data combination and parallel-to-serial conversion module 145 as described for the transmitter end 1.

The DHT module 219 is coupled to the M/2 polyphase filters 217 for receiving the filtered first down-sampled I-channel Rx baseband signal of M/2 points, and generates the first part of the filtered I-channel baseband signal by performing an M/2-point DHT on the received filtered signal of M/2 points.

The DHT module 219' is coupled to the data combination module 218 for receiving the filtered down-sampled I-channel Rx combination signal of M/2 points, and generates the second part of the filtered I-channel Rx baseband signal by performing an M/2-point DHT on the received filtered signal of M/2 points.

Figure 9:
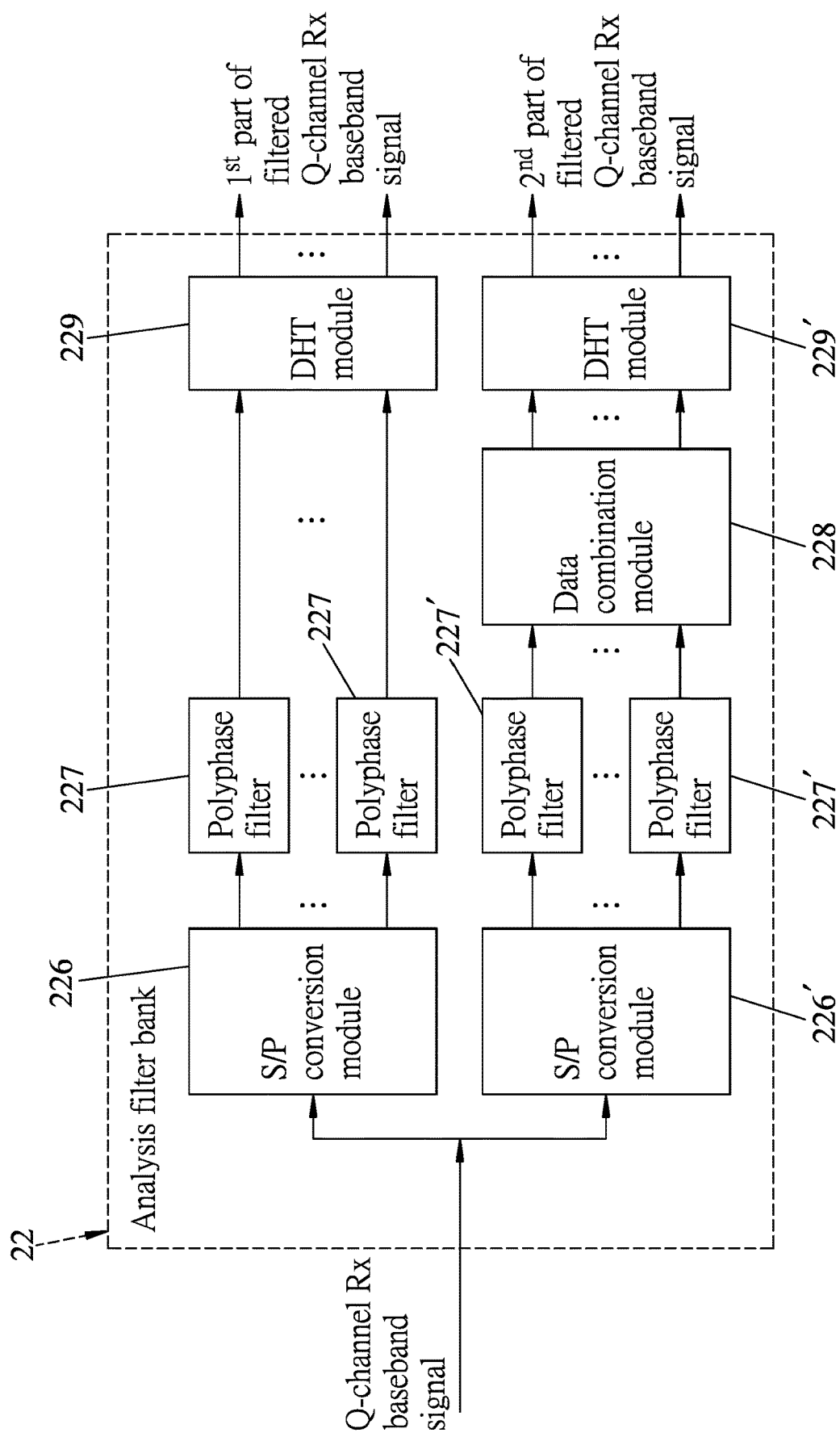

Referring to FIG. 9, the second implementation of the analysis filter bank 22 is shown to be similar to the second implementation of the analysis filter bank 21 (see FIG. 8), and includes two serial-to-parallel conversion modules 226, 226', M/2 different polyphase filters 227, M/2 different polyphase filters 227', a data combination module 228, and two DHT modules 229, 229'. In this embodiment, the M/2 polyphase filters 227 correspond to the third analysis filter group, and the M/2 polyphase filters 227' correspond to the fourth analysis filter group, as described hereinbefore. The analysis filter bank 22 generates the first part and the second part of the filtered Q-channel Rx baseband signal in a similar manner to that the analysis filter bank 21 generates the first part and the second part of the filtered I-channel Rx baseband signal, so details thereof are not repeated herein for the sake of brevity.

Referring back to FIG. 1, the data detection unit 23 is coupled to the analysis filter banks 21, 22 for receiving the first and second parts of the filtered I-channel Rx baseband signal, and the first and second parts of the filtered Q-channel Rx baseband signal. The data detection unit 23 generates M/2 first I-channel detection results corresponding to the first part of the filtered I-channel Rx baseband signal and M/2 first Q-channel detection results corresponding to the first part of the filtered Q-channel Rx baseband signal by performing joint detection on the first parts of the filtered I-channel and Q-channel Rx baseband signals; and generates M/2 second I-channel detection results corresponding to the second part of the filtered I-channel Rx baseband signal and M/2 second Q-channel detection results corresponding to the second part of the filtered Q-channel Rx baseband signal by performing joint detection on the second parts of the filtered I-channel and Q-channel Rx baseband signals. The data detection unit 23 may use, for example, joint zero-forcing, joint minimum mean-squared error, joint maximum likelihood algorithms, and so on, to perform joint detection of data symbols.

The data combiner 24 is coupled to the data detection unit 23, and forms M I-channel detection outcomes in parallel by putting the M/2 first I-channel detection results at even-numbered output positions and the M/2 second I-channel detection results at odd-numbered output positions.

The data combiner 24' is coupled to the data detection unit 23, and forms M Q-channel detection outcomes by putting the M/2 first Q-channel detection results at even-number output positions and the M/2 second Q-channel detection results at odd-numbered positions.

The post-processing unit 25 is a post-processor coupled to the data combiner 24 for receiving the M I-channel detection outcomes, and generates M first post-processed components based on the M I-channel detection outcomes and a post-processing model.

The post-processing unit 25' is a post-processor coupled to the data combiner 24' for receiving the M Q-channel detection outcomes, and generates M second post-processed components based on the M Q-channel detection outcomes and the post-processing model. It is noted that the post-processing model is an inverse of the pre-processing model used by the pre-processing units 13, 13' of the transmitter end 1 (see FIG. 1).

The parallel-to-serial unit 26 is coupled to the post-processing units 25, 25', and outputs the M complex output data symbols in series by performing parallel-to-serial conversion on the M first post-processed components and the M second post-processed components, where each of the complex output data symbols includes a real part and an imaginary part, each of the first post-processed components corresponds to the real part of a respective one of the complex output data symbols, and each of the second post-processed components corresponds to the imaginary part of a respective one of the complex output data symbols.

Figure 10:
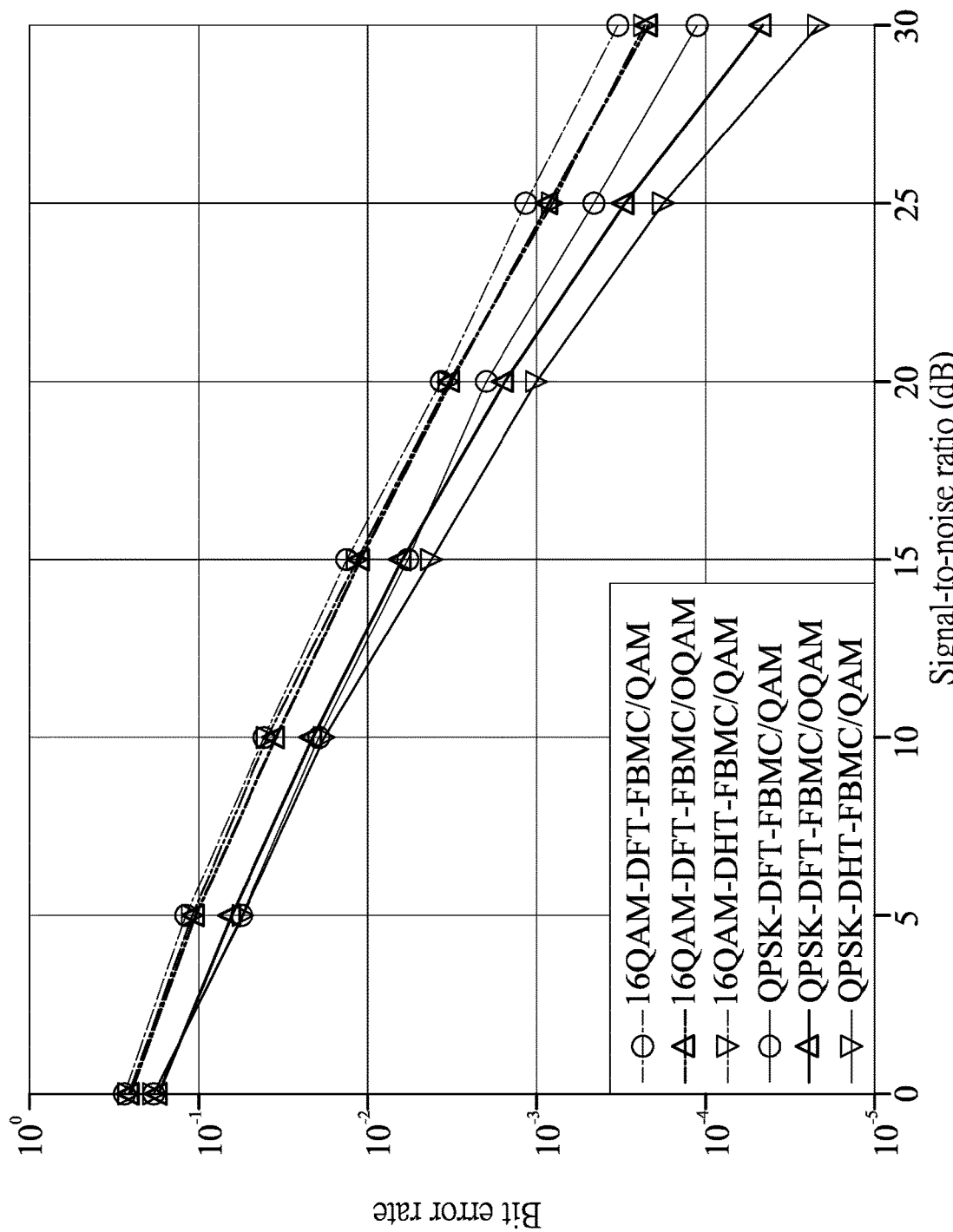
FIG. 10 is a plot of some simulation results that shows performance comparisons among the embodiment of this disclosure (DHT-FBMC/QAM) and two conventional FBMC schemes (DFT-FBMC/OQAM and DFT-FBMC/QAM) in terms of the bit error rate (BER) versus the signal-to-noise ratio (SNR).

FIG. 10 illustrates some simulation results that show performance comparisons among the embodiment of this disclosure (DHT-FBMC/QAM) and two conventional filter bank multicarrier schemes (DFT-FBMC/OQAM and DFT-FBMC/QAM) in terms of the bit error rate (BER) and a signal-to-noise ratio (SNR), where the SNR is defined as a ratio of the signal energy per bit to the noise power spectral density ($E_b/N_0$) at the channel input. The simulation environment and parameter settings used for simulations corresponding to FIG. 10 are listed in Table 1. The PHYDYAS filter is used as the prototype filter $p_0[k]$ for each of the even-numbered subcarriers in the DHT-FBMC/QAM and DFT-FBMC/QAM schemes, and the prototype filter $p_1[k]$ (nearly orthogonal to $p_0[k]$) for each of the odd-numbered subcarriers is with 61 nonzero taps in the frequency domain, which is designed based on minimizing self-interference. In contrast, the PHYDYAS filter is used as the prototype filter for each of the subcarriers in the DFT-FBMC/OQAM system. It can be seen from FIG. 10 that, for a case using quadrature phase shift keying (QPSK) modulation for input data symbols, the DHT-FBMC/QAM scheme achieves much better BER performance than the DFT-FBMC/OQAM system and the DFT-FBMC/QAM system. For a case using 16 quadrature amplitude modulation (16-QAM) for input data symbols, the BER performance of the DHT-FBMC/QAM scheme is still better than that of the DFT-FBMC/QAM system, but is comparable to that of the DFT-FBMC/OQAM system.

TABLE 1

| | |
|---|---|
| Number of Subcarriers (M) | 1024 |
| Overlapping Factor (K) | 4 |
| Number of Trials | 500 (100 FBMC Frames Per Trial) |
| Modulation Type and Channel Encoding | QPSK/16QAM and (2, 1, 7) Convolutional Code |
| Prototype Filters (Length L= KM) | DFT-FMBC/OQAM: PHYDYAS Filter<br>DFT-FBMC/QAM: Even Subcarriers PHYDYAS Filter; Odd Subcarriers 61 Non-Zero Taps (Frequency Domain)<br>DHT-FBMC/QAM: Even Subcarriers PHYDYAS Filter; Odd Subcarriers 61 Non-Zero Taps (Frequency Domain) |
| Channel Bandwidth/ Sample Period | 10 MHz/100 ns |
| Channel Model (Zero-Mean Complex Additive White Gaussian Noise) | ITU Pedestrian A Channel; Relative Delays (ns): [0, 110, 190, 410]; Power Profile (dB): [0, −9.7, −19.2, −22.8] |
| Detection Method | Minimum Mean-Squared Error (MMSE) Equalization + Soft Demapping + Viterbi Decoding |

Table 2 presents a comparison of computational complexity for the DHT-FBMC/QAM (the embodiment of this disclosure), DFT-FBMC/OQAM and DFT-FBMC/QAM schemes, in terms of the number of real multiplications required for transmission/reception of M-point complex QAM data symbols. For simplicity, the data detection part is not considered in the comparison, where the complexities required for data detection in these three schemes are similar when minimum mean-squared error algorithms are adopted. It can be seen from Table 2 that the total number of real multiplications for the DHT-FBMC/QAM scheme is the same as that for the DFT-FBMC/OQAM scheme, but is lower than that for the DFT-FBMC/QAM scheme.

To sum up, the embodiment of the FBMC communication system based on the DHT (referred to as DHT-FBMC/QAM communication system) according to this disclosure involves a real-valued IDHT procedure for the synthesis filter banks 14, 15 of the transmitter end 1 and a real-valued DHT procedure for the analysis filter banks 21, 22 of the receiver end 2. Since the DHT and IDHT have identical mathematic formulations (except for scaling constants), they can be realized using the same software/hardware unit. It is also shown by simulation results that the DHT-FBMC/QAM communication system achieves excellent transmission performance, because of the exploitation of distinct channel diversity gain within mirror-symmetrical subcarriers. In comparison to the conventional DFT-FBMC/OQAM and DFT-FBMC/QAM schemes which require complex-valued IDFT procedures at their transmitter ends and complex-valued DFT procedures at their receiver ends, the DHT-FBMC/QAM system has advantages in terms of implementation and performance. Moreover, the use of QAM, rather than OQAM, allows the DHT-FBMC/QAM system to be easily combined with existing MIMO techniques, such as space time block coding, for further performance improvement.

TABLE 2

($\mu = \log_2 M$)

| | Scheme | | |
|---|---|---|---|
| Function | DFT-FBMC/ OQAM | DFT-FBMC/ QAM | DHT-FBMC/ QAM |
| Data Pre-processing | 4M | 4M | 4M |
| IDFT/IDHT for Multicarrier Modulation | $2[(M/2)(\mu-1) - 3(M/2)]$ | $2[(M/2)(\mu-1) - 3(M/2)]$ | $2 \cdot [(M/2)(\mu-1) - 3(M/2)]$ |
| Synthesis Polyphase Filtering | 4 KM | 4 KM | 4 KM |
| Odd-Part Data Combination/ Phase Rotation | 0 | 4M | 4M |
| Analysis Polyphase Filtering | 4 KM | 4 KM | 4 KM |
| DFT/DHT for Multicarrier Demodulation | $2(M\mu - 3M)$ | $2[(M/2)(\mu-1) - 3(M/2)]$ | $2 \cdot [(M/2)(\mu-1) - 3(M/2)]$ |
| Data Post-processing | 8M | 4M | 4M |
| Total | $3M\mu + 8 KM + 2M$ | $2M\mu + 8 KM + 4M$ | $2M\mu + 8 KM + 4M$ |

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A receiver of a filter bank multicarrier communication system based on the discrete Hartley transform (DHT), said receiver comprising:
a first analysis filter bank disposed to consecutively receive two serial first-channel received (Rx) baseband signals of M/2 points, where M is a positive even integer, and the M/2 points of each of the two serial first-channel Rx baseband signals are received in series, and configured to generate a first part and a second part of a filtered first-channel Rx baseband signal by performing at least serial-to-parallel conversion, down-sampling, filtering, data combination and DHT on the two serial first-channel Rx baseband signals of M/2 points, wherein each of the first part and the second part of the filtered first-channel Rx baseband signal has M/2 components;
a second analysis filter bank disposed to consecutively receive two serial second-channel Rx baseband signals of M/2 points, where the M/2 points of each of the two serial second-channel Rx baseband signals are received in series, and configured to generate a first part and a second part of a filtered second-channel Rx baseband signal by performing at least serial-to-parallel conversion, down-sampling, filtering, data combination and DHT on the two serial second-channel Rx baseband signals of M/2 points, wherein each of the first part and the second part of the filtered second-channel Rx baseband signal has M/2 components;
a data detection unit coupled to the first analysis filter bank and the second analysis filter bank, and configured to generate M/2 first first-channel detection results corresponding to the first part of the filtered first-channel baseband signal, M/2 first second-channel detection results corresponding to the first part of the filtered second-channel Rx baseband signal, M/2 second first-channel detection results corresponding to the second part of the filtered first-channel Rx baseband signal, and M/2 second second-channel detection results corresponding to the second part of the filtered second-channel Rx baseband signal by performing joint detection on the first part of the filtered first-channel Rx baseband signal, the first part of the filtered second-channel Rx baseband signal, the second part of the filtered first-channel Rx baseband signal, and the second part of the filtered second-channel Rx baseband signal;
a first data combiner coupled to the data detection unit, and configured to generate M first-channel detection outcomes by combining the first first-channel detection results and the second first-channel detection results;
a second data combiner coupled to the data detection unit, and configured to generate M second-channel detection outcomes by combining the first second-channel detection results and the second second-channel detection results;
a first post-processing unit coupled to the first data combiner for receiving the M first-channel detection outcomes, and configured to generate M first post-processed components based on the M first-channel detection outcomes and a post-processing model;
a second post-processing unit coupled to the second data combiner for receiving the M second-channel detection outcomes, and configured to generate M second post-processed components based on the M second-channel detection outcomes and the post-processing model; and
a parallel-to-serial unit coupled to the first post-processing unit and the second post-processing unit, and configured to output M complex output data symbols in series by performing parallel-to-serial conversion on the M first post-processed components and the M second post-processed components.

2. The receiver of claim 1, wherein the first analysis filter bank includes:
a first DHT module disposed to receive the two serial first-channel Rx baseband signals of M/2 points, and configured to consecutively generate two first DHT intermediate results of M/2 points by, for each of the two serial first-channel Rx baseband signals of M/2 points, multiplying the serial first-channel Rx baseband signal of M/2 points with a kernel function of an M/2-point DHT;
a first serial-to-parallel conversion and data combination module disposed to receive the two serial first-channel Rx baseband signals of M/2 points, and configured to consecutively output two parallel first-channel combination signals of M/2 points, where the M/2 points of each of the two parallel first-channel combination signals are outputted in parallel, by sequentially performing serial-to-parallel conversion and data combination on each of the two serial first-channel Rx baseband signals;
a first parallel-to-serial conversion module coupled to the first serial-to-parallel conversion and data combination module for receiving the two parallel first-channel combination signals of M/2 points, and configured to consecutively output two serial first-channel combination signals of M/2 points, where the M/2 points of each of the two serial first-channel combination signals are outputted in series, by performing parallel-to-serial conversion on each of the two parallel first-channel combination signals of M/2 points;
a second DHT module coupled to the first parallel-to-serial conversion module for receiving the two serial first-channel combination signals of M/2 points, and configured to consecutively generate two second DHT intermediate results of M/2 points by, for each of the two serial first-channel combination signals of M/2 points, multiplying the serial first-channel combination signal of M/2 points with the kernel function of an M/2-point DHT;
M/2 first prototype filters each coupled to the first DHT module for receiving a respective one of the M/2 points of each of the two first DHT intermediate results, the M/2 first prototype filters being configured to generate two filtered first DHT intermediate results of M/2 points, wherein each of the two filtered first DHT intermediate results of M/2 points is generated by the M/2 first prototype filters each performing filtering on the respective one of the M/2 points of a corresponding one of the two first DHT intermediate results;
M/2 second prototype filters each coupled to the second DHT module for receiving a respective one of the M/2 points of each of the two second DHT intermediate results, the M/2 second prototype filters being configured to generate two filtered second DHT intermediate results of M/2 points, wherein each of the two filtered second DHT intermediate results of M/2 points is generated by the M/2 second prototype filters each performing filtering on the respective one of the M/2 points of a corresponding one of the two second DHT intermediate results;

M/2 first down-sampling modules respectively coupled to the M/2 first prototype filters for respectively receiving the M/2 points of each of the two filtered first DHT intermediate results, and configured to generate the first part of the filtered first-channel Rx baseband signal by each performing, for each of the two filtered first DHT intermediate results, down-sampling on the respective one of the M/2 points of the filtered first DHT intermediate result; and M/2 second down-sampling modules respectively coupled to the M/2 second prototype filters for respectively receiving the M/2 points of each of the two filtered second DHT intermediate results, and configured to generate the second part of the filtered first-channel Rx baseband signal by each performing, for each of the two filtered second DHT intermediate results, down-sampling on the respective one of the M/2 points of the filtered second DHT intermediate result; and wherein the second analysis filter bank includes:
a third DHT module disposed to receive the two serial second-channel Rx baseband signals of M/2 points, and configured to consecutively generate two third DHT intermediate results of M/2 points by, for each of the two serial second-channel Rx baseband signals of M/2 points, multiplying the serial second-channel Rx baseband signal of M/2 points with the kernel function of the M/2-point DHT;

a second serial-to-parallel conversion and data combination module disposed to receive the two serial second-channel Rx baseband signals of M/2 points, and configured to consecutively output two parallel second-channel combination signals of M/2 points, where the M/2 points of each of the two parallel second-channel combination signals are outputted in parallel, by sequentially performing serial-to-parallel conversion and data combination on each of the two serial second-channel Rx baseband signals;

a second parallel-to-serial conversion module coupled to the second serial-to-parallel conversion and data combination module for receiving the two parallel second-channel combination signals of M/2 points, and configured to consecutively output two serial second-channel combination signals of M/2 points, where the M/2 points of each of the serial second-channel combination signals are outputted in series, by performing parallel-to-serial conversion on each of the two parallel second-channel combination signals of M/2 points;

a fourth DHT module coupled to the second parallel-to-serial conversion module for receiving the two serial second-channel combination signals of M/2 points, and configured to consecutively generate two fourth DHT intermediate results of M/2 points by, for each of the two sets of the serial second-channel combination signals of M/2 points, multiplying the serial second-channel combination signal of M/2 points with the kernel function of an M/2-point DHT;

M/2 third prototype filters each coupled to the third DHT module for receiving a respective one of the M/2 points of each of the two third DHT intermediate results, the M/2 third prototype filters being configured to generate two filtered third DHT intermediate results of M/2 points, wherein each of the filtered third DHT intermediate results of M/2 points is generated by the M/2 third prototype filters each performing filtering on the respective one of the M/2 points of a corresponding one of the two third DHT intermediate results;

M/2 fourth prototype filters each coupled to the fourth DHT module for receiving a respective one of the M/2 points of each of the two fourth DHT intermediate results, the M/2 fourth prototype filters being configured to generate two filtered fourth DHT intermediate results of M/2 points, wherein each of the filtered fourth DHT intermediate results of M/2 points is generated by the M/2 fourth prototype filters each performing filtering on the respective one of the M/2 points of each of the two fourth DHT intermediate results;

M/2 third down-sampling modules respectively coupled to the M/2 third prototype filters for respectively receiving the M/2 points of each of the two filtered third DHT intermediate results, and configured to generate the first part of the filtered second-channel Rx baseband signal by each performing, for each of the two filtered third DHT intermediate results, down-sampling on the respective one of the M/2 points of the filtered third DHT intermediate result; and M/2 fourth down-sampling modules respectively coupled to the M/2 fourth prototype filters for respectively receiving the M/2 points of each of the two filtered fourth DHT intermediate results, and configured to generate the second part of the filtered second-channel Rx baseband signal by each performing, for each of the two filtered fourth DHT intermediate results, down-sampling on the respective one of the M/2 points of the filtered fourth DHT intermediate result.

3. The receiver of claim 1, wherein the first analysis filter bank includes:
a first serial-to-parallel conversion module disposed to receive the two serial first-channel Rx baseband signals of M/2 points, and configured to consecutively output two parallel first down-sampled first-channel Rx baseband signals of M/2 points, where the M/2 points of each of the parallel first down-sampled first-channel Rx baseband signals are outputted in parallel, by sequentially performing serial-to-parallel conversion and down-sampling on the serial first-channel Rx baseband signals of M/2 points;

a second serial-to-parallel conversion module disposed to receive the two serial first-channel Rx baseband signals of M/2 points, and configured to consecutively output two parallel second down-sampled first-channel Rx baseband signals of M/2 points, where the M/2 points of each of the parallel second down-sampled first-channel Rx baseband signals are outputted in parallel, by sequentially performing serial-to-parallel conversion and down-sampling on the serial first-channel Rx baseband signals of M/2 points;

M/2 different first polyphase filters each coupled to the first serial-to-parallel conversion module for receiving a respective one of the M/2 points of each of the two parallel first down-sampled first-channel Rx baseband signals, and configured to generate a filtered first down-sampled first-channel Rx baseband signal of M/2 points by each sequentially performing, for each of the two parallel first down-sampled first-channel Rx baseband signals, filtering and down-sampling on the respective one of the M/2 points of the parallel first down-sampled first-channel Rx baseband signal;

M/2 different second polyphase filters each coupled to the second serial-to-parallel conversion module for receiving a respective one of the M/2 points of each of the two parallel second down-sampled first-channel Rx baseband signals, and configured to generate a filtered second down-sampled first-channel Rx baseband signal of M/2 points by each sequentially performing, for each of the two parallel second down-sampled first-channel Rx baseband signals, filtering and down-sampling on the respective one of the M/2 points of each of the parallel second down-sampled first-channel Rx baseband signal;

a first data combination module coupled to the M/2 second polyphase filters for receiving the filtered second down-sampled first-channel Rx baseband signal of M/2 points, and configured to generate a second down-sampled first-channel combination signal of M/2 points by performing data combination on the filtered second down-sampled first-channel Rx baseband signal of M/2 points;

a first DHT module coupled to the M/2 first polyphase filters for receiving the filtered first down-sampled first-channel Rx baseband signal of M/2 points, and configured to generate the first part of the filtered first-channel Rx baseband signal by performing an M/2-point DHT on the filtered first down-sampled first-channel Rx baseband signal of M/2 points; and a second DHT module coupled to the first data combination module for receiving the second down-sampled first-channel combination signal of M/2 points, and configured to generate the second part of the filtered first-channel Rx baseband signal by performing an M/2-point DHT on the second down-sampled first-channel combination signal of M/2 points; and wherein the second analysis filter bank includes:
 a third serial-to-parallel conversion module disposed to receive the two serial second-channel Rx baseband signals of M/2 points, and configured to consecutively output two parallel first down-sampled second-channel Rx baseband signals of M/2 points, where the M/2 points of each of the parallel first down-sampled second-channel Rx baseband signals are outputted in parallel, by sequentially performing serial-to-parallel conversion and down-sampling on the serial second-channel Rx baseband signals of M/2 points;
 a fourth serial-to-parallel conversion module disposed to receive the two serial Rx second-channel baseband signals of M/2 points, and configured to consecutively output two parallel second down-sampled second-channel Rx baseband signals of M/2 points, where the M/2 points of each of the parallel second down-sampled second-channel Rx baseband signals are outputted in parallel, by sequentially performing serial-to-parallel conversion and down-sampling on the serial second-channel Rx baseband signals of M/2 points;
 M/2 different third polyphase filters each coupled to the third serial-to-parallel conversion module for receiving a respective one of the M/2 points of each of the two parallel first down-sampled second-channel Rx baseband signals, and configured to generate a filtered first down-sampled second-channel Rx baseband signal of M/2 points by each sequentially performing, for each of the two parallel first down-sampled second-channel Rx baseband signals, filtering and down-sampling on the respective one of the M/2 points of the parallel first down-sampled second-channel Rx baseband signal;
 M/2 different fourth polyphase filters each coupled to the fourth serial-to-parallel conversion module for receiving a respective one of the M/2 points of each of the two parallel second down-sampled second-channel Rx baseband signals, and configured to generate a filtered second down-sampled second-channel Rx baseband signal of M/2 points by each sequentially performing, for each of the two parallel second down-sampled second-channel Rx baseband signals, filtering and down-sampling on the respective one of the M/2 points of each of the parallel second down-sampled second-channel Rx baseband signal;
 a second data combination module coupled to the M/2 fourth polyphase filters for receiving the filtered second down-sampled second-channel Rx baseband signal of M/2 points, and configured to generate a second down-sampled second-channel combination signal of M/2 points by performing data combination on the filtered second down-sampled second-channel Rx baseband signal of M/2 points;
 a third DHT module coupled to the M/2 third polyphase filters for receiving the filtered first down-sampled second-channel Rx baseband signal of M/2 points, and configured to generate the first part of the filtered second-channel Rx baseband signal by performing an M/2-point DHT on the filtered first down-sampled second-channel Rx baseband signal of M/2 points; and
 a fourth DHT module coupled to the second data combination module for receiving the second down-sampled second-channel combination signal of M/2 points, and configured to generate the second part of the filtered second-channel Rx baseband signal by performing an M/2-point DHT on the second down-sampled second-channel combination signal of M/2 points.

4. The receiver of claim 3, wherein the first analysis filter bank is equivalent to including:
 a first analysis filter group of M/2 analysis filters respectively corresponding to M/2 subcarriers for the M/2 components of the first part of the filtered first-channel Rx baseband signal, and corresponding to the M/2 first polyphase filters; and
 a second analysis filter group of M/2 analysis filters respectively corresponding to M/2 subcarriers for the M/2 components of the second part of the filtered first-channel Rx baseband signal, and corresponding to the M/2 second polyphase filters;
wherein the second analysis filter bank is equivalent to including:
 a third analysis filter group of M/2 analysis filters respectively corresponding to M/2 subcarriers for the M/2 components of the first part of the filtered second-channel Rx baseband signal, and corresponding to the M/2 third polyphase filters; and
 a fourth analysis filter group of M/2 analysis filters respectively corresponding to M/2 subcarriers for the M/2 components of the second part of the filtered second-channel Rx baseband signal, and corresponding to the M/2 fourth polyphase filters;
wherein, for each of the first and second analysis filter banks, one of the analysis filters that corresponds to a $(2\alpha+\beta)^{th}$ one of the subcarriers is represented by $p_p[k]$ $cas(2\pi\alpha k/(M/2))$, where $k=0, 1, 2, 3, \ldots, L-1$;

wherein each of the first, second, third and fourth analysis filter groups has a system function $G_{\beta,\alpha}(z)$ that is obtained from a z-transform of $p_p[k]\mathrm{cas}(2\pi\alpha k/(M/2))$, $k=0, 1, 2, 3, \ldots, L-1$, and that is represented by $$G_{\beta,\alpha}(z) = \sum_{q=0}^{M/2-1} \psi_{\alpha,q} P_\beta^{(q)}(z^{M/2}) z^{-q}$$

with $\alpha \in \{0,1,2,K,M/2-1\}$, $\beta \in \{0,1\}$ and $\omega_{\alpha,q}=\mathrm{cas}(2\pi\alpha q/(M/2))$ representing a kernel function of an M/2-point DHT;

$$P_\beta^{(q)}(z^{M/2}) = \sum_{r=0}^{2K-1} p_\beta[q + r(M/2)] z^{-r(M/2)}$$

represents $q^{th}$ one of the first polyphase filters for the first analysis filter group with $\beta=0$, a $q^{th}$ one of the second polyphase filters for the second analysis filter group with $\beta=1$, a $q^{th}$ one of the third polyphase filters for the third analysis filter group with $\beta=0$, and a $q^{th}$ one of the fourth polyphase filters for the fourth analysis filter group with $\beta=1$; each of the first, second, third and fourth polyphase filters has a length of 2K; and $\mathrm{cas}(\phi)=\cos(\phi)+\sin(\phi)$.

\* \* \* \* \*